(12) United States Patent
Gaal et al.

(10) Patent No.: US 9,154,272 B2
(45) Date of Patent: Oct. 6, 2015

(54) METHOD AND APPARATUS FOR FACILITATING RELIABLE TRANSMISSION OF A CONTROL REGION SIZE AND DETECTION OF CROSS-CARRIER SIGNALING

(75) Inventors: Peter Gaal, San Diego, CA (US); Wanshi Chen, San Diego, CA (US); Jelena M. Damnjanovic, Del Mar, CA (US); Aamod Dinkar Khandekar, San Diego, CA (US); Juan Montojo, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 573 days.

(21) Appl. No.: 12/773,807

(22) Filed: May 4, 2010

(65) Prior Publication Data

US 2011/0116456 A1 May 19, 2011

Related U.S. Application Data

(60) Provisional application No. 61/176,465, filed on May 7, 2009.

(51) Int. Cl.
*H04L 5/00* (2006.01)
(52) U.S. Cl.
CPC ............ *H04L 5/0007* (2013.01); *H04L 5/0053* (2013.01); *H04L 5/0092* (2013.01)
(58) Field of Classification Search
None
See application file for complete search history.

(56) References Cited

U.S. PATENT DOCUMENTS

| 8,325,863 | B2 | 12/2012 | Stamoulis et al. |
| 2006/0291403 | A1 | 12/2006 | Kahtava et al. |
| 2009/0052387 | A1* | 2/2009 | Lee et al. ..................... 370/329 |
| 2009/0300456 | A1 | 12/2009 | Pelletier et al. |
| 2010/0142455 | A1 | 6/2010 | Imamura |

(Continued)

FOREIGN PATENT DOCUMENTS

| CN | 201018490 Y | 2/2008 |
| CN | 101321148 A | 12/2008 |

(Continued)

OTHER PUBLICATIONS

International Search Report and Written Opinion—PCT/US2010/033935—International Search Authority, European Patent Office, Feb. 4, 2011.

(Continued)

*Primary Examiner* — Mohammad Adhami
(74) *Attorney, Agent, or Firm* — Paul Kuo

(57) ABSTRACT

Methods, apparatuses, and computer program products are disclosed for facilitating indicating and detecting control region sizes. A multi-carrier communication between a wireless terminal and a base station is facilitated by a first carrier having a first control region size and a second carrier having a second control region size. Embodiments are disclosed in which control region sizes are ascertained from a control signal, wherein the control is generated by either scrambling an aspect of the control signal based on the second control region size, or relating the second control region size with the first control region size. Other disclosed embodiments for ascertaining control region sizes include a reverse interleaver embodiment, wherein a set of modulation symbols is mapped beginning from a last data symbol and ending with a first available data symbol.

42 Claims, 16 Drawing Sheets

(56) References Cited

U.S. PATENT DOCUMENTS

| | | | |
|---|---|---|---|
| 2010/0232373 | A1 | 9/2010 | Nory et al. |
| 2010/0232382 | A1 | 9/2010 | Gauvreau et al. |
| 2010/0254329 | A1 | 10/2010 | Pan et al. |
| 2010/0279628 | A1* | 11/2010 | Love et al. .................. 455/70 |
| 2010/0303039 | A1 | 12/2010 | Zhang et al. |
| 2011/0021191 | A1 | 1/2011 | Damnjanovic et al. |
| 2011/0026473 | A1 | 2/2011 | Luo et al. |
| 2011/0194501 | A1* | 8/2011 | Chung et al. ................. 370/328 |
| 2012/0039179 | A1* | 2/2012 | Seo et al. ..................... 370/241 |

FOREIGN PATENT DOCUMENTS

| | | |
|---|---|---|
| CN | 101411086 A | 4/2009 |
| EP | 1944896 A1 | 7/2008 |
| JP | 2010516129 A | 5/2010 |
| JP | 2010183201 A | 8/2010 |
| JP | 2010528554 A | 8/2010 |
| JP | 2011529661 A | 12/2011 |
| WO | WO-2006042326 | 4/2006 |
| WO | WO2008147123 A1 | 12/2008 |
| WO | WO-2009014401 A2 | 1/2009 |
| WO | 2010106786 A1 | 9/2010 |

OTHER PUBLICATIONS

Ericsson: "Control signaling for carrier aggregation", 3GPP TSG-RAN WG1 Meeting #55b, R1-090375, Jan. 12, 2009.

ZTE: "Downlink Control Signalling Design for LTE-A" 3GPP Draft; R1-091429 Downlink Control Signalling Design for LTE-A, 3rd Generation Partnership Project (3GPP), Mobile Competence Centre ; 650, Route Des Lucioles ; F-06921 Sophia-Antipolis Cedex ; France, no. Seoul, Korea; Mar. 17, 2009, XP050339008 p. 2, paragraph 6.1-p. 3.

Taiwan Search Report—TW099114707—TIPO—Feb. 19, 2014.

LG Electronics: "Dynamic Cell Clustering for CoMP", R1-090657, 3GPP TSG RAN WG1 Meeting #56, pp. 1-3, Feb. 9 to 13, 2009.

Nokia Siemens Networks: "Setup of CoMP cooperation areas", R1-090725, 3GPP TSG RAN WG1 Meeting #56, pp. 1-4, Feb. 9 to 13, 2009.

Samsung: "CoMP Operational Mode Feedback Discussions", R1-091869, 3GPP TSG RAN WG1 Meeting #57, May 4 to 8, 2009.

Ericsson: "Downlink CoMP", 3GPP Draft, R1-090914 (DL COMP}, 3rd Generation Partnership Project (3GPP), Mobile Competence Centre, 650, Route Des Lucioles, F-06921 Sophia-Antipolis Cedex, France, no. Athens, Greece, Feb. 4, 2009, XP050318755, [retrieved on Feb. 4, 2009].

Huawei: "Inter-eNB and Intra-eNB Schemes for CoMP in LTE-Advanced", 3GPP Draft TSG RAN WG#54; R1-083050, 3rd Generation Partnership Project (3GPP), Jeju, Korea, (Aug. 18-22, 2008).

Huawei, Qualcomm Europe, RITT, CMCC: Solutions for DL CoMP Transmission—For Issues on Control Zone, CRS and DRS, 3GPP TSG RAN WGI Meeting 56, Feb. 9, 2009, pp. 1-9, XP002630581, Athens, Greece Retrieved from the Internet: URL:http://ftp.3gpp.org/tsg_ran/WGI_RLI/TS GRI_56/Docs/ [retrieved on Mar. 28, 2011].

Samsung: "Design Considerations for COMP Joint Transmission", 3GPP Draft, R1-091868 Design Considerations for COMP Joint Transmission, 3rd Generation Partnership Project (3GPP), Mobile Competence Centre, 650, Route Des Lucioles, F-06921 Sophia-Antipolis Cedex, France, no. San Francisco, USA, Apr. 28, 2009, XP050339364, [retrieved on Apr. 28, 2009].

Huawei: 3GPP TSG RAN WG1 Meeting #56, R1-090821, Solutions for DL CoMP Transmission for Issues on Control Zone, CRS and DRS Athens, 2009, Greece, Feb. 9-13, pp. 1-8.

* cited by examiner

METHOD AND APPARATUS FOR FACILITATING RELIABLE TRANSMISSION OF A CONTROL REGION SIZE AND DETECTION OF CROSS-CARRIER SIGNALING

CROSS-REFERENCE TO RELATED APPLICATIONS

This application claims the benefit of U.S. Provisional Patent Application Ser. No. 61/176,465 entitled "A Method and Apparatus for Reliable PCFICH Transmission and Detection of Cross-Carrier PDCCH Signaling," which was filed May 7, 2009. The aforementioned application is herein incorporated by reference in its entirety.

BACKGROUND

I. Field

The following description relates generally to wireless communications, and more particularly to methods and apparatuses for facilitating reliable transmission of control region size and detection of cross-carrier signaling.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

With respect to LTE-Advanced (LTE-A) systems, it is noted that each user equipment (UE) may be configured via radio resource control (RRC) to monitor multiple component carriers. For such configurations, it is desirable to design control for multi-carrier operation by considering overhead, efficiency, reliability, robustness, complexity, and so on. In the case of cross-carrier Physical Downlink Control Channel (PDCCH) signaling, the PDCCH is typically sent from the so-called anchor carrier. Currently, however, there are concerns over the reliability of Physical Control Format Indicator Channel (PCFICH) detection on the non-anchor carriers, and the resulting performance loss when Physical Downlink Shared Channel (PDSCH) decoding is based on a wrong PCFICH. For example, this may occur in heterogeneous networks where the non-anchor carrier(s) may be highly interfered.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with locating a wireless terminal. In one aspect, methods and computer program products are disclosed that facilitate indicating a size of a control region. These embodiments include establishing a multi-carrier communication facilitated by a first carrier and a second carrier. A first control region size and a second control region size are then ascertained. For these embodiments, the first control region size is associated with the first carrier, whereas the second control region size is associated with the second carrier. A control signal is then generated by either scrambling an aspect of the control signal based on the second control region size, or relating the second control region size with the first control region size. The control signal is then transmitted over the first carrier to support the multi-carrier communication on the second carrier for at least one user equipment.

In another aspect, an apparatus configured to facilitate indicating a size of a control region is disclosed. Within such embodiment, the apparatus includes a processor configured to execute computer executable components stored in memory. The computer executable components include a communication component, a control format component, and a generation component. The communication component is configured to establish a multi-carrier communication, wherein a control signal is communicated via the multi-carrier communication. For this embodiment, the control signal is transmitted over a first carrier to support the multi-carrier communication on a second carrier for at least one user equipment. The control format component is then configured to ascertain a first control region size and a second control region size, wherein the first control region size is associated with the first carrier, and wherein the second control region size is associated with the second carrier. The generation component is then configured to generate the control signal by performing at least one of scrambling an aspect of the control signal based on the second control region size, or relating the second control region size with the first control region size.

In a further aspect, another apparatus is disclosed. Within such embodiment, the apparatus includes means for transmitting, means for determining, and means for generating. For this embodiment, the means for transmitting transmits a control signal via a multi-carrier communication, wherein the control signal is transmitted over a first carrier to support the multi-carrier communication on a second carrier for at least one user equipment. The means for determining determines a first control region size and a second control region size, wherein the first control region size is associated with the first carrier, and wherein the second control region size is associated with the second carrier. The means for generating then generates the control signal by performing at least one of scrambling an aspect of the control signal based on the second control region size, or relating the second control region size with the first control region size.

In another aspect, other methods and computer program products are disclosed for indicating a size of a control region. For these embodiments, a multi-carrier communication facilitated by a first carrier and a second carrier is established with at least one user equipment. A reverse interleaver is then implemented to reverse interleave a set of modulation symbols. Within such embodiments, the reverse interleaver maps a set of modulation symbols beginning from a last data symbol and ending with a first available data symbol. The set of modulation symbols are then transmitted to the at least one user equipment.

Another apparatus for indicating a size of a control region is also disclosed. Within such embodiment, the apparatus includes a processor configured to execute computer executable components stored in memory. The computer executable components include a reverse interleaver component and a communication component. The reverse interleaver component is configured to map a set of modulation symbols beginning from a last data symbol and ending with a first available data symbol, whereas the communication component is configured to transmit the set of modulation symbols to at least one user equipment via a multi-carrier communication. Within such embodiment, the multi-carrier communication is facilitated by a first carrier and a second carrier.

In a further aspect, another apparatus is disclosed. Within such embodiment, the apparatus includes means for reverse interleaving and means for providing. For this embodiment, the means for reverse interleaving interleaves a set of modulation symbols, wherein the set of modulation symbols are mapped beginning from a last data symbol and ending with a first available data symbol. Meanwhile, the means for providing provides the set of modulation symbols to at least one user equipment via a multi-carrier communication. For this embodiment, the multi-carrier communication is also facilitated by a first carrier and a second carrier.

In other aspects, methods and computer program products are disclosed for facilitating determining a size of a control region. Such embodiments may include a series of acts and/or instructions. For instance an act/instruction is included to configure a user equipment to monitor a first carrier and a second carrier. A control signal is then received via the first carrier and the second carrier, wherein the first carrier has a first control region size, and wherein the second carrier has a second control region size. These embodiments further include ascertaining the first control region size and the second control region size by performing at least one of descrambling an aspect of the control signal, or relating the second control region size with the first control region size.

An apparatus configured to facilitate determining a size of a control region is also disclosed. Within such embodiment, the apparatus includes a processor configured to execute computer executable components stored in memory. The computer executable components include a configuration component, a communication component, and a decoding component. The configuration component is configured to direct a user equipment to monitor a first carrier and a second carrier. The communication component is configured to receive a control signal via the first carrier and the second carrier, wherein the first carrier has a first control region size, and wherein the second carrier has a second control region size. The decoding component is then configured to determine the first control region size and the second control region size by performing at least one of descrambling an aspect of the control signal, or relating the second control region size with the first control region size.

In a further aspect, another apparatus is disclosed. Within such embodiment, the apparatus includes means for initializing, means for receiving, and means for ascertaining. The means for initializing initializes a user equipment to monitor a first carrier and a second carrier. The means for receiving receives a control signal via the first carrier and the second carrier, wherein the first carrier has a first control region size, and wherein the second carrier has a second control region size. The means for ascertaining then ascertains the first control region size and the second control region size by performing at least one of descrambling an aspect of the control signal, or relating the second control region size with the first control region size. In a particular embodiment, the apparatus further includes a means for decoding the second control region size from the first carrier.

In yet another aspect, other methods and computer program products are disclosed for facilitating determining a size of a control region. Within such embodiments, a user equipment is configured to monitor a first carrier and a second carrier, wherein the first carrier has a first control region size, and wherein the second carrier has a second control region size. A set of reverse interleaved modulation symbols are then received. For these embodiments, the set of reverse interleaved modulation symbols are mapped beginning from a last data symbol and ending with a first available data symbol. Furthermore, these embodiments include ascertaining the first control region size and the second control region size by de-interleaving the set of reverse interleaved modulation symbols.

Another apparatus for facilitating determining a size of a control region is also disclosed. Within such embodiment, the apparatus includes a processor configured to execute computer executable components stored in memory. The computer executable components include a configuration component, a communication component, and a decoding component. The configuration component is configured to initialize a user equipment to monitor a first carrier and a second carrier, wherein the first carrier has a first control region size, and wherein the second carrier has a second control region size. The communication component is configured to receive a set of reverse interleaved modulation symbols. For this embodiment, the set of reverse interleaved modulation symbols are mapped beginning from a last data symbol and ending with a first available data symbol. The decoding component is then configured to decode the first control region size and the second control region size by de-interleaving the set of reverse interleaved modulation symbols.

In a further aspect, yet another apparatus is disclosed. Within such embodiment, the apparatus includes means for configuring, means for receiving, and means for de-interleaving. For this embodiment, the means for configuring configures a user equipment to monitor a first carrier and a second carrier, wherein the first carrier has a first control region size, and wherein the second carrier has a second control region size. The means for receiving then receives a set of reverse interleaved modulation symbols. Here, the set of reverse interleaved modulation symbols are again mapped beginning from a last data symbol and ending with a first available data symbol. The means for de-interleaving is then configured to de-interleave the set of reverse interleaved modulation symbols to ascertain the first control region size and the second control region size.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
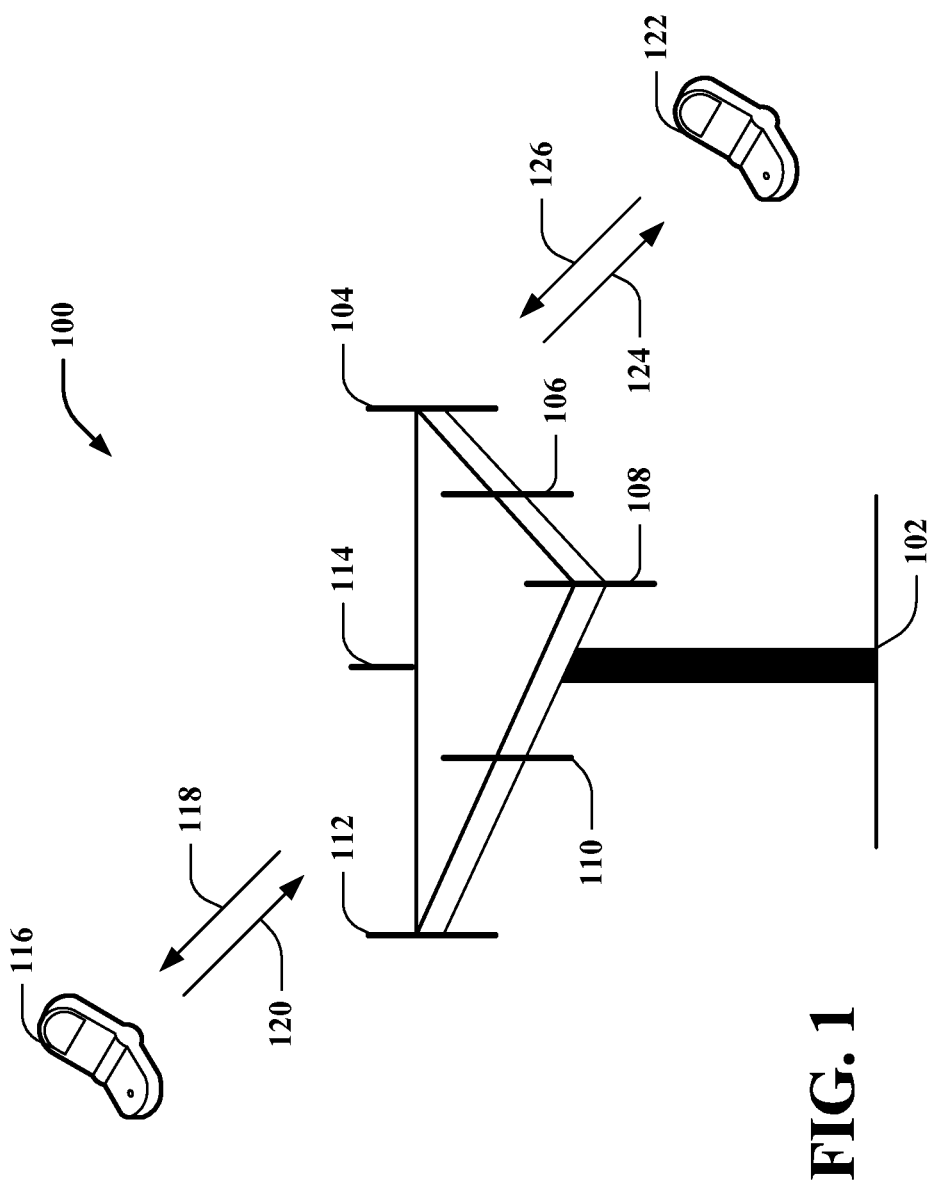
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification is directed towards facilitating reliable transmission of control region size and detection of cross-carrier signaling. As stated previously, it is desirable to design an efficient and reliable control scheme for LTE-A multi-carrier operation. To this end, it is noted that at least two particular options are contemplated for encoding the layer 2 control information to a UE. In the first option, a separate PDCCH for each component carrier is contemplated where either one PDCCH indicates an allocation on the same component carrier, or one PDCCH indicates an allocation on the same or a different component carrier (i.e., cross-carrier PDCCH signaling). In the second option, a common PDCCH is contemplated, wherein the information for the component carriers assigned to one UE is jointly encoded, and wherein either the downlink control information (DCI) format size is dynamically changed according to the number of component carriers assigned, or the DCI format size is semi-statically fixed according to the number of component carriers the UE is monitoring.

As stated previously, in the case of cross-carrier PDCCH signaling, the PDCCH is typically sent from the so-called anchor carrier, which raises particular concerns over the reliability of PCFICH detection on the non-anchor carriers, as well as the resulting performance loss when PDSCH decoding is based on a wrong PCFICH. This may occur in heterogeneous networks, for example, where the non-anchor carrier(s) may be highly interfered. The subject disclosure provides novel techniques for improving the reliability of PCFICH transmission and detection. Moreover, several design options are disclosed which enhance PCFICH detection reliability for PDSCH decoding on the non-anchor carriers in case of cross-layer signaling for LTE-A multi-carrier operation. Several techniques for transmitting the PCFICH of the non-anchor carriers using the anchor carrier are also provided.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA.

CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), access point base station, or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
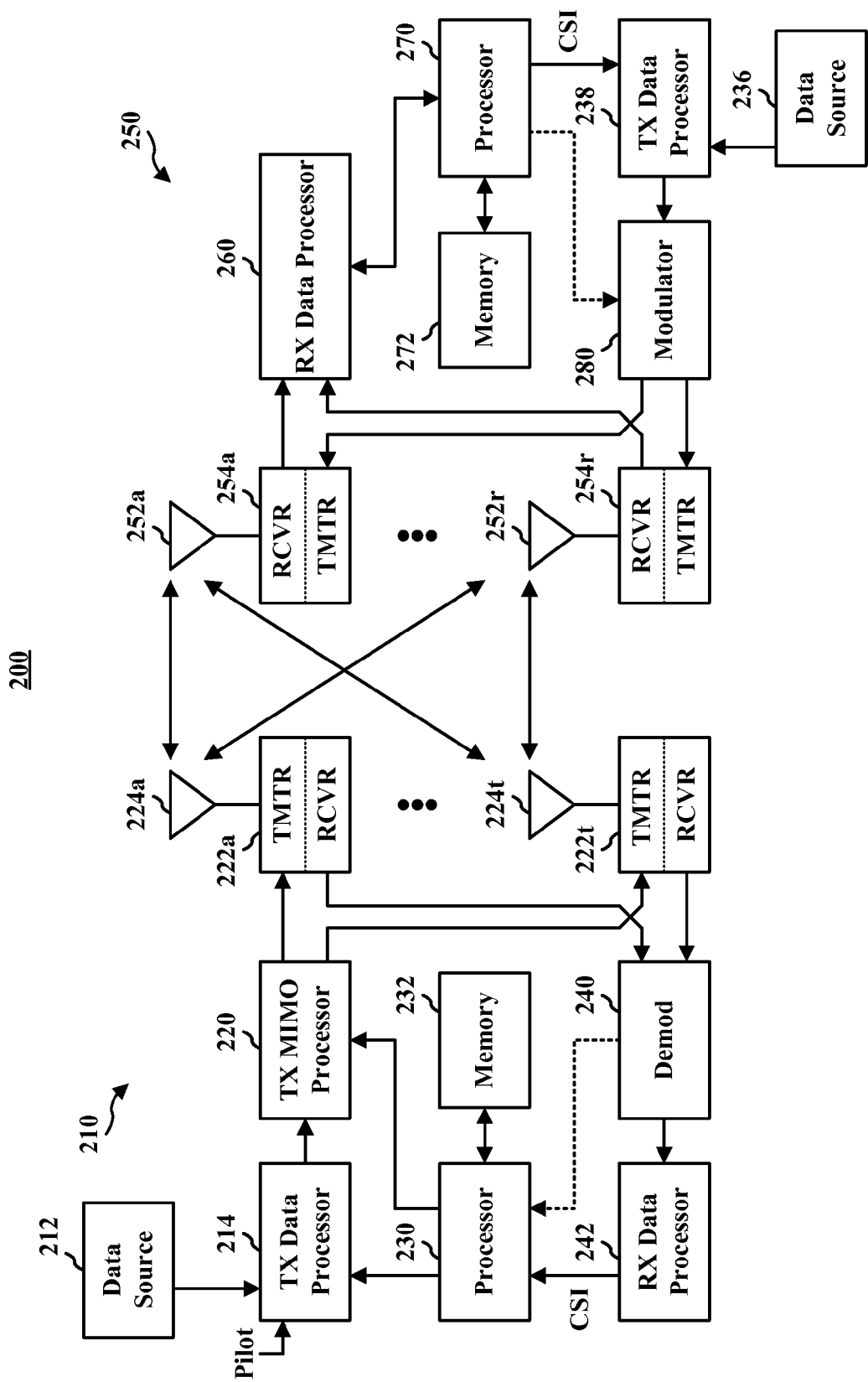
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
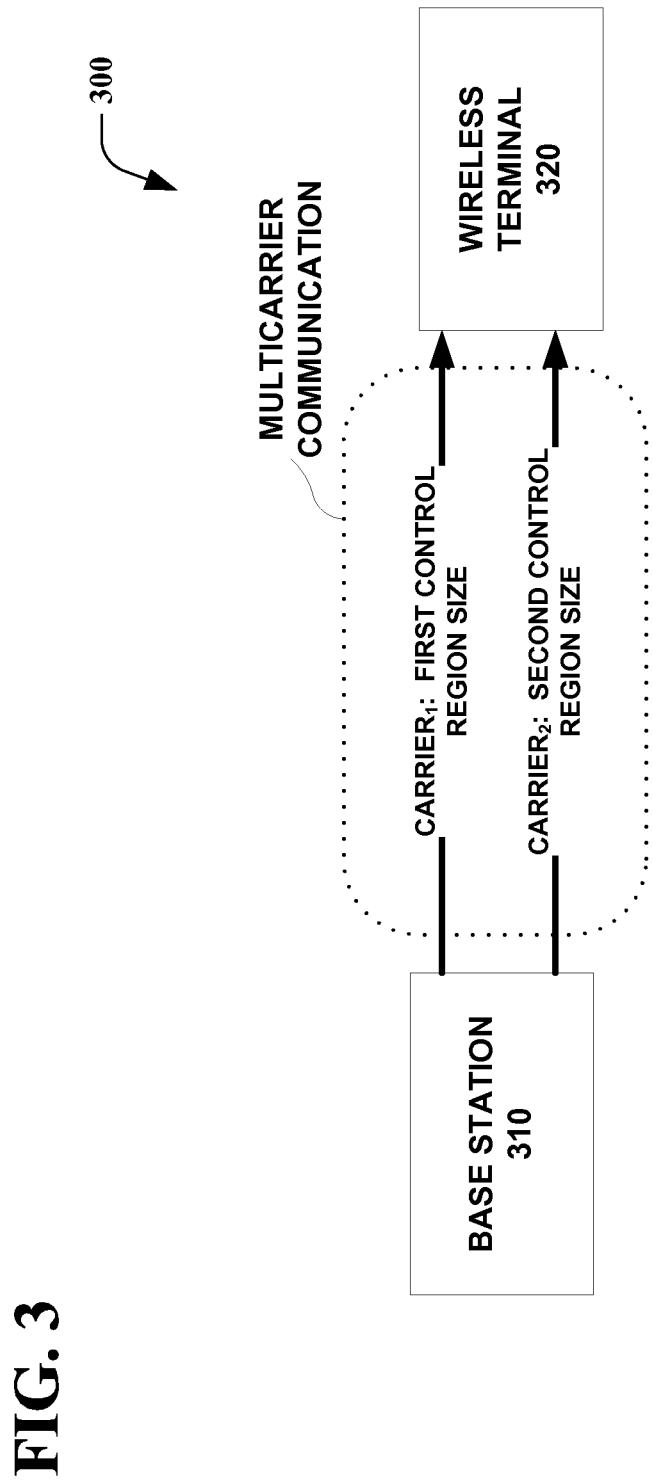
FIG. 3 is an illustration of an exemplary system for facilitating reliable transmission of control region size and detection of cross-carrier signaling according to an embodiment.

Referring next to FIG. 3, an exemplary system for facilitating reliable transmission of control region size and detection of cross-carrier signaling according to an embodiment is provided. As illustrated, system 300 includes base station 310 which is communicatively coupled to wireless terminal 320. Within such embodiment, a multi-carrier communication is facilitated by at least a first and second carrier having respective control region sizes, as shown. Here, the first carrier may be an anchor carrier, whereas the second carrier may be a non-anchor carrier. In order to address the aforementioned concerns over the reliability of PCFICH detection on the non-anchor carriers, as well as the resulting performance loss when PDSCH decoding is based on a wrong PCFICH, a few preliminary solutions are contemplated.

In a first preliminary solution, the PCFICH information is embedded as the PDCCH payload in the PDCCH. Here, although such solution is relatively simple and robust, it may nevertheless be undesirable if a reuse of the LTE Release-8 DCI formats is desired as much as possible for LTE-A multi-carrier operations, since the payload size of the PDCCH is generally increased.

A second preliminary solution would be to hard-code the PCFICH information from a PDSCH perspective on the non-anchor carriers. That is, for cross-carrier signaling, the indicated PDSCH transmission via PDCCH on non-anchor carriers can be assumed to be a fixed PCFICH value on the corresponding carriers (e.g., three symbols). Here, although such solution is relatively simple, it also includes an overhead cost. In heterogeneous networks, for example, if the non-anchor carriers are heavily interfered, the usable PDSCH symbols are limited by the maximum number of PCFICH symbols from all the strongest interfering cells. In that case, the three hard-coded symbols may not be very pessimistic. Nevertheless, it is noted that two modes of operations can be implemented, wherein one mode implements a "regular" PCFICH transmission and detection from the non-anchor carrier for PDSCH (e.g., consistent with Release-8), and wherein the other mode implements the hardcoded PCFICH value from the PDSCH decoding perspective as described above. For such embodiment, the configuration of which mode is to be used can then be on a per UE basis or on a per cell basis. In a further aspect, the fixed PCFICH value for PDSCH decoding can be broadcasted and/or signaled, instead of hard-coded at one value all the time.

A third preliminary solution would be to have the PCFICH information of the non-anchor carriers transmitted from the anchor carrier. Moreover, within such embodiment, the PCFICH for non-anchor PDSCH decoding is transmitted from the anchor carrier, and can be in accordance with a Release-8 PCFICH structure. Although such approach may be relatively inefficient due to its broadcast nature, it is noted that the eNodeB may strategically turn the PCFICH on/off for some carriers based on the actual scheduled transmissions.

In an aspect, several further solutions are contemplated, which attempt to address the limitations of the aforementioned preliminary solutions. For instance, in a first embodiment, the PDCCH cyclic redundancy check (CRC) is scrambled based on the PCFICH of the carrier for which the PDCCH signaling is intended. Within such embodiment, a "generalized" PCFICH value can be implemented on the second carrier, wherein the cross-carrier signaled PCIFCH value may not necessarily be the same as the same-carrier signaled PCIFCH value. In other words, on the second carrier, the same-carrier signaled PCIFCH value may be broadcast as usual. However, for UEs with cross-carrier signaling where PDCCH is sent on the first carrier and PDSCH is sent on the second carrier, the cross-carrier signaled PCFICH value (e.g., the PCFICH value sent via scrambling, etc) may not necessarily be the same as the PCIFCH value that is broadcast on the second carrier.

Generally, it may be desirable to have the number of cross-carrier signaled PCFICH values no less than the number of broadcasted same-carrier PCFICH values. For some embodiments, however, the number of cross-carrier signaled PCFICH values may be less than the number of same-carrier PCFICH values for the purpose of overhead and performance tradeoff. For example, the number of cross-carrier PCFICH values may be less than the three fixed PCFICH values for same-carrier signaling. Here, it is thus noted that PCFICH may take up to three different values, and that these three values of PCFICH for scrambling PDCCH CRC are similar to having three different RNTIs (Radio Network Temporary Identities), which may increase the false alarm probability.

In order to address these false alarm probability concerns, the PDCCH CRC scrambling technique can be combined with the aforementioned third preliminary solution in which PCFICH information of the non-anchor carriers is transmitted from the anchor carrier. Namely, by combining PCFICH-based PDCCH CRC scrambling and having PCFICH for non-anchor carriers transmitted from the anchor carrier, the PCFICH transmission and detection reliability can be greatly improved, without increasing the false alarm probability. Furthermore, it is noted that the broadcast nature of having the PCFICH information of the non-anchor carriers transmitted from the anchor carrier may help other UEs detect the PCFICH transmitted on the non-anchor carrier via cross-checking of the same PCFICH transmitted on the anchor carrier.

In another aspect, the PCFICH-based PDCCH CRC scrambling technique is combined with continuing to transmit PCFICH on the non-anchor carrier. As a result, the UE may rely on the PCFICH transmitted on the non-anchor carrier (the one the PDSCH is transmitted on) and the PCFICH used for CRC scrambling of the corresponding PDCCH transmitted from the anchor carrier for the purpose of PCFICH detection. By implementing such a combined technique, PCFICH reliability can be significantly enhanced.

In yet another embodiment, the same PCFICH value can be utilized across carriers on a per UE basis. For instance, within such embodiment, each UE being assigned PDSCH(s) via cross-layer signaling can just assume that the non-anchor carrier(s) have the same PCFICH value as the one on the anchor carrier.

An interleaver-based embodiment is also contemplated, which implements a new channel interleaver design for mapping modulation symbols onto resource elements. For this embodiment, the modulation symbols can be mapped from the last orthogonal frequency-division multiplexing (OFDM) symbol in the sub-frame following the same "frequency first, time second" interleaving structure as in Release-8. In this case, for decoding with unreliable PCFICH, the receiver could "erase" the modulation symbols "falling" in the first three OFDM symbols (since these symbols could be control symbols). Namely, the process at the receiver may include erasing an initial sequence of a set of reverse interleaved modulation symbols, wherein the initial sequence begins with the last data symbol.

As mentioned previously, a potential solution for reliable PCFICH transmission is to communicate the PCFICH of the non-anchor carriers via the anchor carrier. For this particular approach, it would be desirable to maintain backward compatibility in terms of PCFICH/PHICH (Physical Hybrid ARQ (HARM) Indicator Channel)/PDCCH design on the anchor carrier. A few exemplary options on how to transmit the PCFICH are contemplated herein. In a first exemplary option, the actual resource used for the non-anchor PCFICH can be from the unused resource element groups (REGs) residing after the anchor PCFICH/PHICH/PDCCH, and/or the last control channel element(s) (CCE(s)) for PDCCH since the last CCEs for PDCCH are typically the least used for actual PDCCH transmissions.

In a second exemplary option, the cross-carrier PCFICH is conveyed on specific PHICH-configured resources. For instance, some PHICH resources can be designated for PCFICH, wherein exactly which PHICH resources can be specified in the system information. Although such technique may pose a slight scheduling restriction, it also provides for better granularity (i.e., smaller than CCE) and configurability compared to fixing it to the last CCE in PDCCH.

In a third exemplary option, the PCFICH is sent in a dedicated manner as part of the PDSCH resources. For this particular embodiment, the grant can be provided on one (anchor) carrier and would assign certain bandwidth resources on possibly another carrier, wherein the PCFICH would be embedded in the assigned PDSCH according to a particular pattern (e.g., making sure it is placed after the third OFDM symbol). Moreover, this process includes conveying a control region size of a non-anchor carrier in a data region of an anchor carrier, wherein the conveying occurs according to a pre-determined pattern and during a cross-carrier communication. The process may also include puncturing and/or rate matching PDSCH data transmissions. Here, assuming that some form of inter-cell interference coordination (ICIC) is present on the data channel, reliability should not be an issue.

Figure 4:
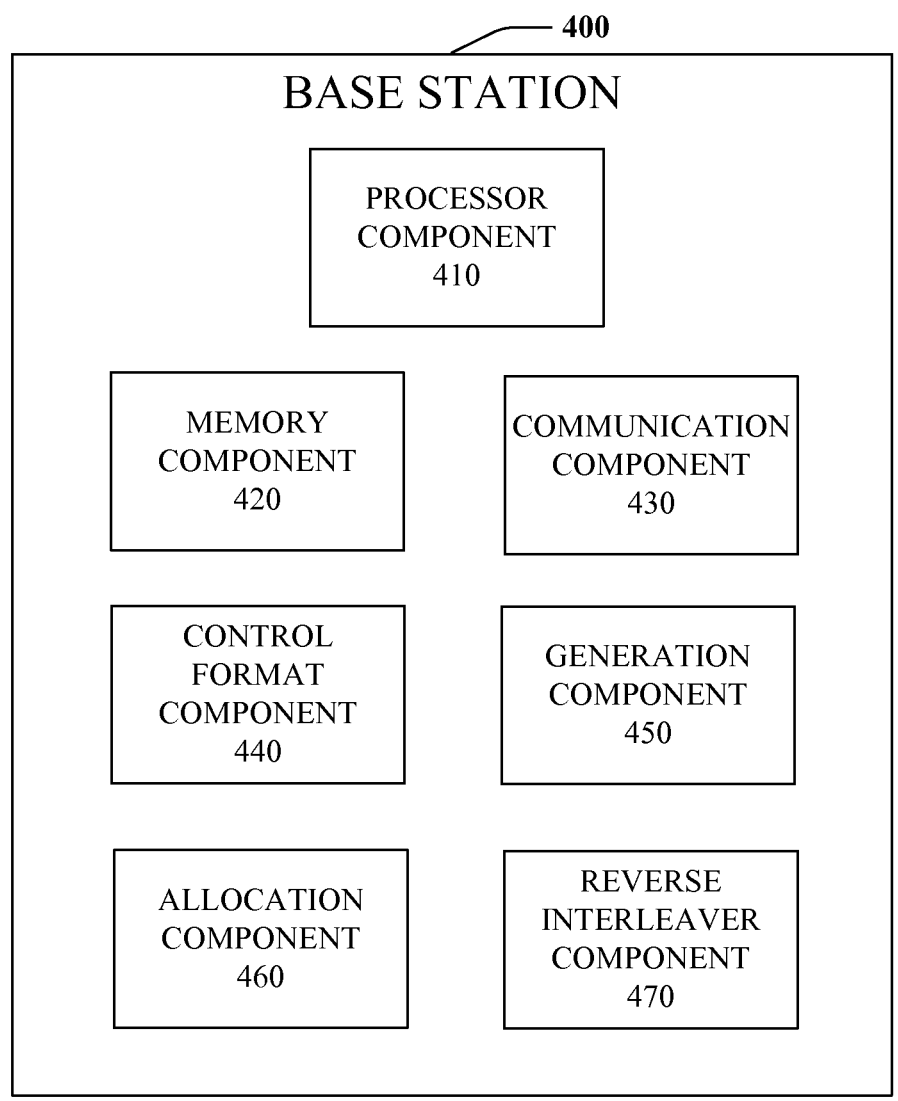
FIG. 4 illustrates a block diagram of an exemplary base station that facilitates indicating a control region size in accordance with an aspect of the subject specification.

Referring next to FIG. 4, a block diagram of an exemplary base station that facilitates indicating a size of a control region according to an embodiment is provided. As shown, base station 400 may include processor component 410, memory component 420, communication component 430, control format component 440, generation component 450, allocation component 460, and reverse interleaver component 470.

In one aspect, processor component 410 is configured to execute computer-readable instructions related to performing any of a plurality of functions. Processor component 410 can be a single processor or a plurality of processors dedicated to analyzing information to be communicated from base station 400 and/or generating information that can be utilized by memory component 420, communication component 430, control format component 440, generation component 450, allocation component 460, and/or reverse interleaver component 470. Additionally or alternatively, processor component 410 may be configured to control one or more components of base station 400.

In another aspect, memory component 420 is coupled to processor component 410 and configured to store computer-readable instructions executed by processor component 410. Memory component 420 may also be configured to store any of a plurality of other types of data including generated by any of communication component 430, control format component 440, generation component 450, allocation component 460, and/or reverse interleaver component 470. Memory component 420 can be configured in a number of different configurations, including as random access memory, battery-backed memory, hard disk, magnetic tape, etc. Various features can also be implemented upon memory component 420, such as compression and automatic back up (e.g., use of a Redundant Array of Independent Drives configuration).

In yet another aspect, base station 400 includes communication component 430, which is coupled to processor component 410 and configured to interface base station 400 with external entities. For instance, communication component 430 may be configured to communicate a control signal via a multi-carrier communication. For this particular embodiment, the control signal is transmitted over a first carrier to support the multi-carrier communication on a second carrier for at least one user equipment.

As illustrated, base station 400 may also include control format component 440. Within such embodiment, control format component 440 is configured to ascertain control region sizes. For instance, in a particular embodiment, control format component 440 is configured to ascertain a first control region size associated with the first carrier, and a second control region size associated with the second carrier.

In another aspect, base station 400 may further include generation component 450, which is configured to generate the aforementioned control signal. Here, it should be noted that generation component 450 may be configured to generate control signals in any of a plurality of ways. For instance, in a first exemplary embodiment, generation component 450 generates a control signal by relating the second control region size with the first control region size. Within such embodiment, generation component 450 is configured to perform the relating by configuring the at least one user equipment to assume that the first control region size is equal to the second control region size during a cross-carrier communication. For this particular embodiment, communication component 430 may be configured to transmit a Physical Downlink Control Channel transmission over the first carrier, and to transmit a Physical Downlink Shared Channel transmission over the second carrier.

In a second exemplary embodiment, however, generation component 450 is configured to generate the control signal by scrambling an aspect of the control signal (e.g., a cyclic redundancy check) based on the second control region size. Within such embodiment, generation component 450 may be configured to encode the second control region size onto the first carrier. For instance, generation component may be configured to convey the second control region size in a data region of the first carrier according to a pre-determined pattern and during a cross-carrier communication. For this particular embodiment, communication component 430 may also be configured to transmit a Physical Downlink Control Channel transmission over the first carrier, and to transmit a Physical Downlink Shared Channel transmission over the second carrier. In an aspect, generation component 450 is configured to puncture the Physical Downlink Shared Channel transmission using the data region of the first carrier whereas, in another aspect, generation component 450 is configured to rate match the Physical Downlink Shared Channel transmission using the data region of the first carrier.

In a further aspect, generation component 450 may be further configured to provide a generalized Physical Control Format Indicator Channel value on the second carrier. For such embodiments, it is noted that the cross-carrier signaled Physical Control Format Indicator Channel value (e.g., the value sent via scrambling, etc) may not necessarily be the same as the Physical Control Format Indicator Channel value that is broadcast on the second carrier. Moreover, for such embodiments, the cross-carrier number of Physical Control Format Indicator Channel values may be different than the same-carrier number of Physical Control Format Indicator Channel values.

It should be further noted that generation component 450 may utilize allocation component 460 to facilitate encoding the second control region size onto the first carrier. For instance, allocation component 460 may be configured to allocate any of a plurality of resources for encoding the second control region size onto the first carrier. In an aspect, the allocated resource is at least one of a last set of control channel elements in a sequence of control channel elements, wherein the last set of control channel elements is associated with a Physical Downlink Control Channel. In another aspect, the allocated resource is associated with a Physical Hybrid Automatic Repeat Request Indicator Channel. In yet another aspect, the allocated resource is an unused resource element group in a sequence of resource element groups, wherein the unused resource element group resides after a used resource element group. For this particular embodiment, allocation component 460 is configured to allocate the used resource element group to the first carrier, wherein the used resource element group is associated with at least one of a Physical Control Format Indicator Channel, a Physical Hybrid Automatic Repeat Request Indicator Channel, or a Physical Downlink Control Channel.

For some embodiments, rather than indicating a size of a control region via a control signal, base station 400 utilizes reverse interleaver component 470. For such embodiments, reverse interleaver component 470 may be configured to map a set of modulation symbols beginning from a last data symbol and ending with a first available data symbol, whereas communication component 430 may be configured to transmit the set of modulation symbols to a user equipment via a multi-carrier communication facilitated by a first and second carrier. In an aspect, reverse interleaver component 470 is configured to map the set of modulation symbols according to a frequency first, time second, interleaving scheme. In another aspect, the set of modulation symbols is associated with a Physical Downlink Shared Channel.

Figure 5:
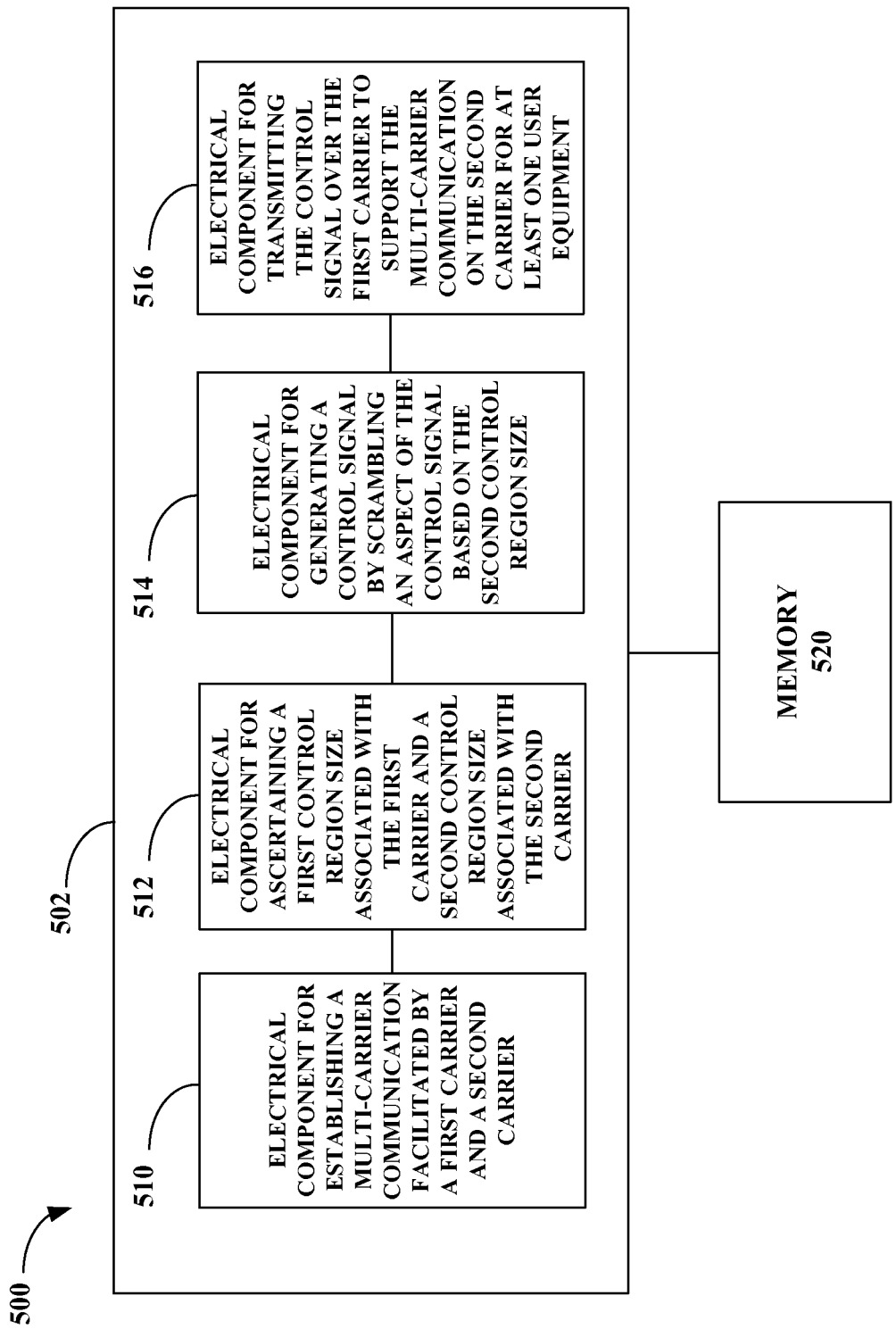
FIG. 5 is an illustration of a first exemplary coupling of electrical components that effectuate indicating a control region size.

Turning to FIG. 5, illustrated is a system 500 that facilitates indicating a size of a control region according to an embodiment. System 500 and/or instructions for implementing system 500 can reside within a network entity (e.g., base station 400) or a computer-readable storage medium, for instance. As depicted, system 500 includes functional blocks that can represent functions implemented by a processor, software, or combination thereof (e.g., firmware). System 500 includes a logical grouping 502 of electrical components that can act in conjunction. As illustrated, logical grouping 502 can include an electrical component for establishing a multi-carrier communication facilitated by a first carrier and a second carrier 510, as well as an electrical component for ascertaining a first control region size associated with the first carrier and a second control region size associated with the second carrier 512. Logical grouping 502 can also include an electrical component for generating a control signal by scrambling an aspect of the control signal based on the second control region size 514. Further, logical grouping 502 can include an electrical component for transmitting the control signal over the first carrier to support the multi-carrier communication on the second carrier for at least one user equipment 516. Additionally, system 500 can include a memory 520 that retains instructions for executing functions associated with electrical components 510, 512, 514, and 516, wherein any of electrical components 510, 512, 514, and 516 can exist either within or outside memory 520.

Figure 6:
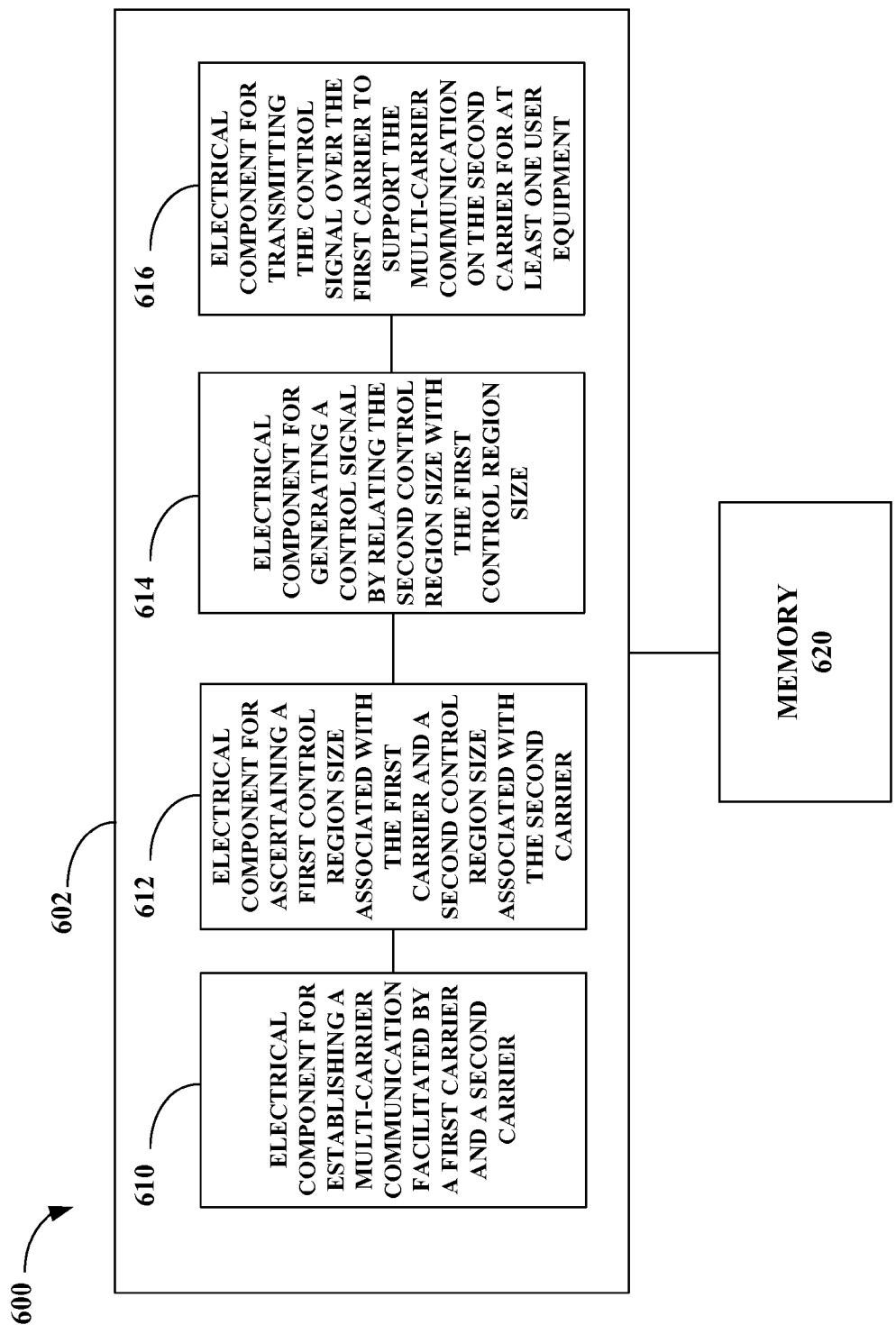
FIG. 6 is an illustration of a second exemplary coupling of electrical components that effectuate indicating a control region size.

Referring next to FIG. 6, illustrated is another system 600 that facilitates indicating a size of a control region according to an embodiment. System 600 and/or instructions for implementing system 600 can also reside within a network entity (e.g., base station 400) or a computer-readable storage medium, for instance, wherein system 600 includes functional blocks that can represent functions implemented by a processor, software, or combination thereof (e.g., firmware). Moreover, system 600 includes a logical grouping 602 of electrical components that can act in conjunction similar to logical grouping 502 in system 500. As illustrated, logical grouping 602 can include an electrical component for establishing a multi-carrier communication facilitated by a first carrier and a second carrier 610, as well as an electrical component for ascertaining a first control region size associated with the first carrier and a second control region size associated with the second carrier 612. Logical grouping 602 can also include an electrical component for generating a control signal by relating the second control region size with the first control region size 614. Further, logical grouping 602 can include an electrical component for transmitting the control signal over the first carrier to support the multi-carrier communication on the second carrier for at least one user equipment 616. Additionally, system 600 can include a memory 620 that retains instructions for executing functions associated with electrical components 610, 612, 614, and 616. While shown as being external to memory 620, it is to be understood that electrical components 610, 612, 614, and 616 can exist within memory 620.

Figure 7:
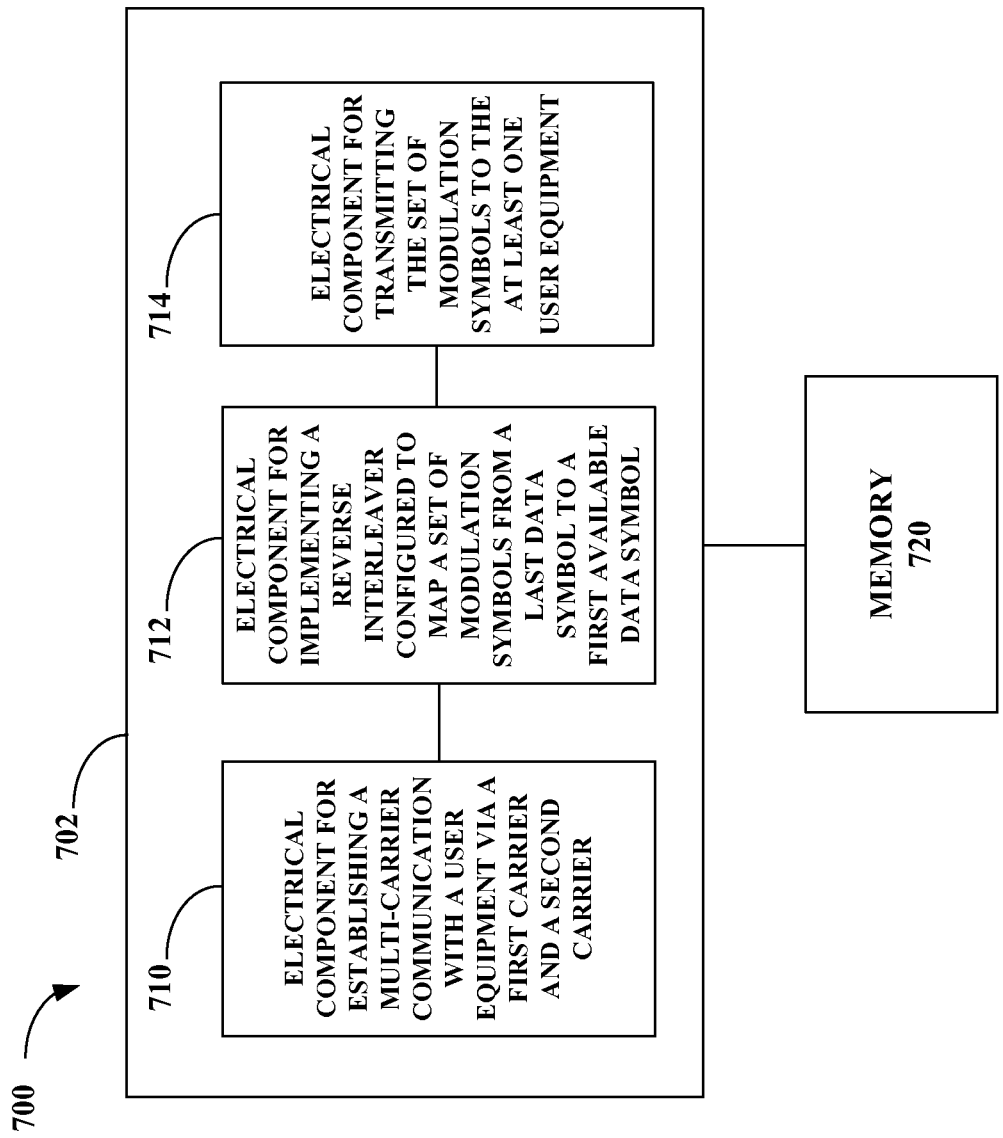
FIG. 7 is an illustration of a third exemplary coupling of electrical components that effectuate indicating a control region size.

Referring next to FIG. 7, yet another exemplary system 700 that facilitates indicating a size of a control region is illustrated. System 700 and/or instructions for implementing system 700 can physically reside within a network entity (e.g., base station 400) or computer-readable storage medium, for instance, wherein system 700 includes functional blocks that can represent functions implemented by a processor, software, or combination thereof (e.g., firmware). Moreover, system 700 includes a logical grouping 702 of electrical components that can act in conjunction similar to logical groupings 502 and 602 in systems 500 and 600, respectively. As illustrated, logical grouping 702 can include an electrical component for establishing a multi-carrier communication with a user equipment via a first carrier and a second carrier 710. Furthermore, logical grouping 702 can include an electrical component for implementing a reverse interleaver configured to map a set of modulation symbols from a last data symbol to a first available data symbol 712. Logical grouping 702 can also include an electrical component for transmitting the set of modulation symbols to the at least one user equipment 714. Additionally, system 700 can include a memory 720 that retains instructions for executing functions associated with electrical components 710, 712, and 714. While shown as being external to memory 720, it is to be understood that electrical components 710, 712, and 714 can exist within memory 720.

Figure 8:
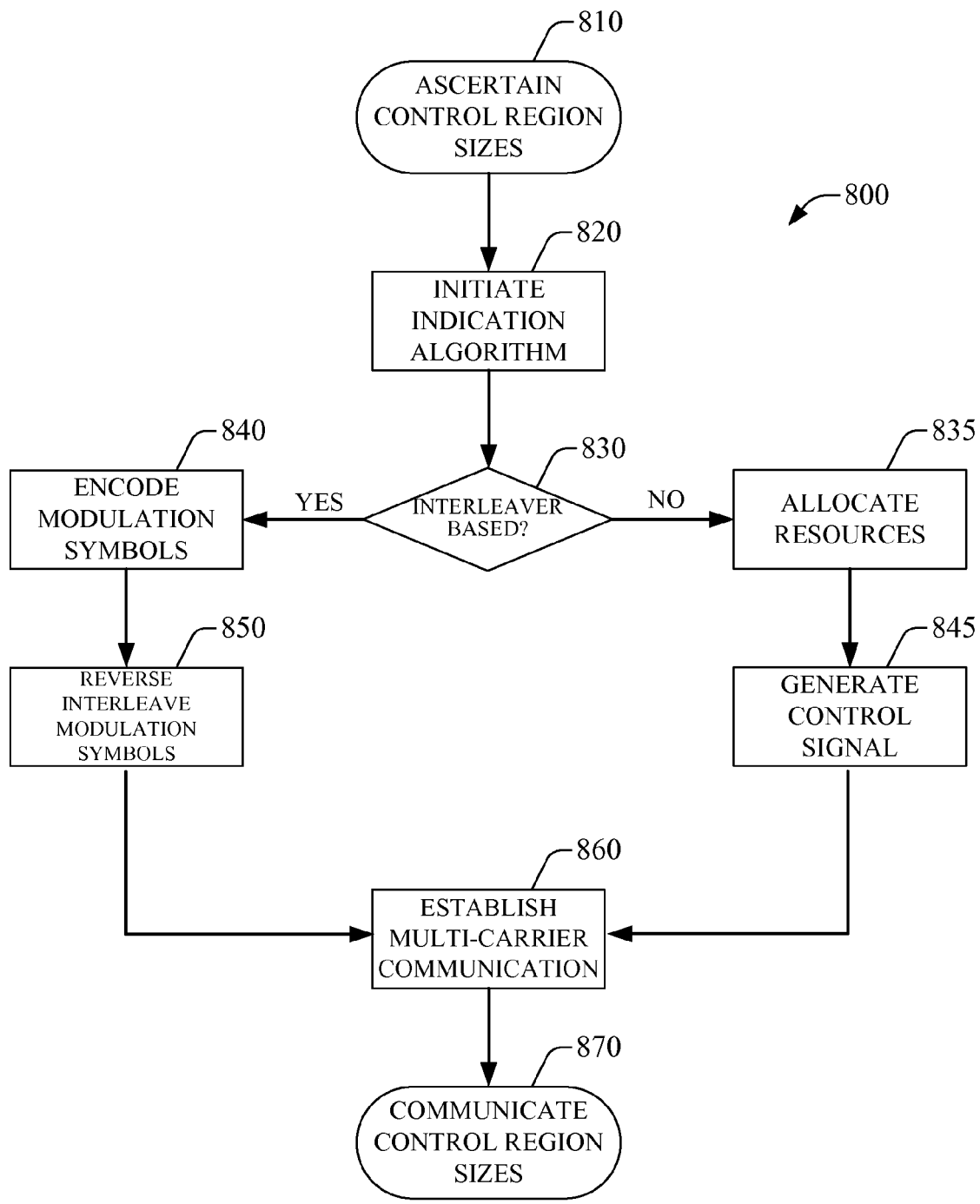
FIG. 8 is a flow chart illustrating an exemplary methodology for facilitating indicating a control region size in accordance with an aspect of the subject specification.

Referring next to FIG. 8, a flow chart illustrating an exemplary method for facilitating indicating a size of a control region is provided. As illustrated, process 800 includes a series of acts that may be performed by various components of a network entity (e.g., base station 400) according to an aspect of the subject specification. Process 800 may be implemented by employing at least one processor to execute computer executable instructions stored on a computer readable storage medium to implement the series of acts. In another embodiment, a computer-readable storage medium comprising code for causing at least one computer to implement the acts of process 800 are contemplated.

In an aspect, process 800 begins with control region sizes being ascertained at act 810. Since multi-carrier operations are contemplated, act 810 may include ascertaining a first control region size associated with a first carrier, as well as ascertaining a second control region size associated with a second carrier.

Next, at act 820, a particular indication algorithm for communicating the control region sizes to a wireless terminal is initiated. Here, it should be noted that any of a plurality of algorithms can be implemented including, for example, interleaver-based algorithms, as well as algorithms in which control region sizes are encoded within a control signal. At act 830, for instance, process 800 may include a determination of whether an interleaver-based algorithm is implemented.

If an interleaver-based algorithm is implemented, process 800 proceeds to act 840 where a set of modulation symbols are encoded. Once the modulation symbols are encoded, the modulation symbols are then reverse interleaved at act 850. Next, at act 860, a multi-carrier communication is established with a wireless terminal, wherein the control region sizes are subsequently communicated at act 870 in accordance with the interleaver-based algorithm.

However, if an interleaver-based algorithm is not implemented, process 800 may proceed to act 835 where resources are allocated to facilitate encoding the control region sizes within a control signal. Once the resources are allocated, the control signal is then generated at act 845. Here, it should be noted that the control region sizes may be encoded onto the control signal in any of a plurality of ways. For instance, the control signal may be generated by scrambling an aspect of the control signal based on the second control region size, and/or relating the second control region size with the first control region size. Once the control signal is generated, process 800 proceeds to act 860 where a multi-carrier communication is established with a wireless terminal. The control region sizes are then communicated by transmitting the control signal to the wireless terminal at act 870.

Figure 9:
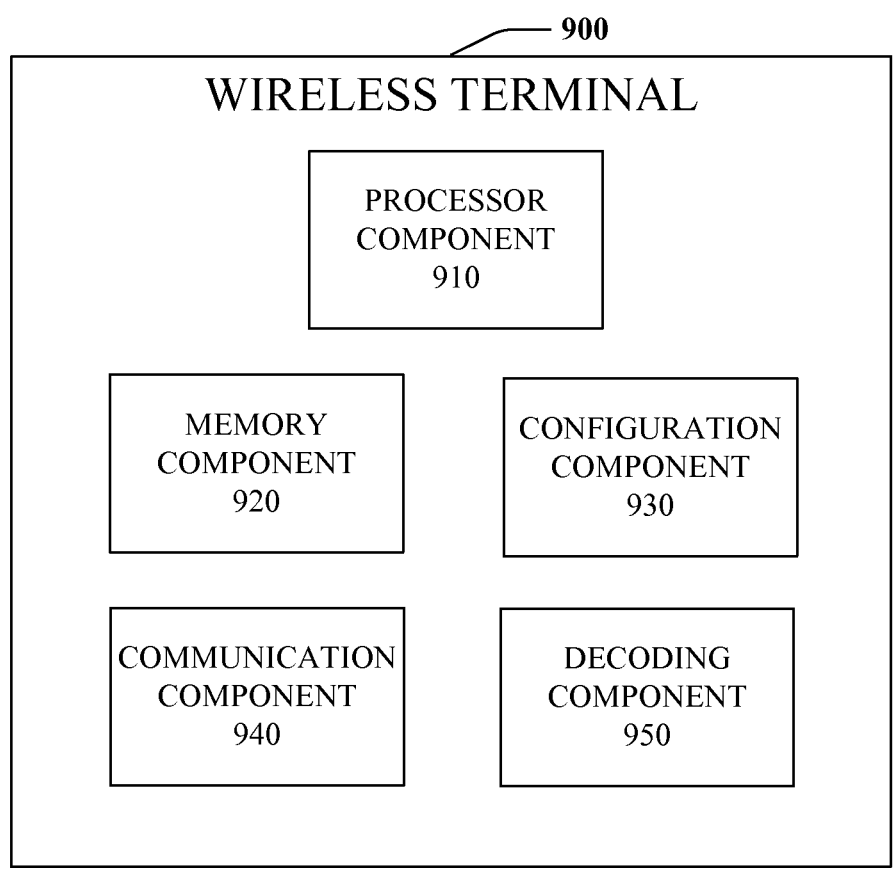
FIG. 9 illustrates a block diagram of an exemplary wireless terminal that facilitates determining a control region size in accordance with an aspect of the subject specification.

Referring next to FIG. 9, a block diagram illustrates an exemplary wireless terminal that facilitates determining a size of a control region in accordance with various aspects. As illustrated, wireless terminal 900 may include processor component 910, memory component 920, configuration component 930, communication component 940, and decoding component 950.

Similar to processor component 410 in base station 400, processor component 910 is configured to execute computer-readable instructions related to performing any of a plurality of functions. Processor component 910 can be a single processor or a plurality of processors dedicated to analyzing information to be communicated from wireless terminal 900 and/or generating information that can be utilized by memory component 920, configuration component 930, communication component 940, and/or decoding component 950. Additionally or alternatively, processor component 910 may be configured to control one or more components of wireless terminal 900.

In another aspect, memory component 920 is coupled to processor component 910 and configured to store computer-readable instructions executed by processor component 910.

Memory component 920 may also be configured to store any of a plurality of other types of data including data generated by any of configuration component 930, communication component 940, and/or decoding component 950. Here, it should be noted that memory component 920 is analogous to memory component 420 in base station 400. Accordingly, it should be appreciated that any of the aforementioned features/configurations of memory component 420 are also applicable to memory component 920.

As illustrated, wireless terminal 900 may also include configuration component 930, communication component 940, and/or decoding component 950. In an aspect, configuration component 930 configures wireless terminal 900 to monitor a first and second carrier. Communication component 940 is then configured to interface wireless terminal 900 with external entities, whereas decoding component 950 is configured to determine a first control region size associated with the first carrier and a second control region size associated with the second carrier.

In a first exemplary embodiment, wireless terminal 900 is configured to determine control region sizes via a received control signal. Within such embodiment, communication component 940 is configured to receive a control signal via the first and second carriers, whereas decoding component 950 is configured to determine the first control region size and the second control region size by either descrambling an aspect of the control signal, or relating the second control region size with the first control region size. For instance, when descrambling the control signal, decoding component 950 may be configured to descramble a cyclic redundancy check of the control signal. The descrambling may also be facilitated by having decoding component 950 configured to decode the second control region size from the first carrier.

When relating the second control region size with the first control region size, decoding component 950 may be configured to assume that the first control region size is equal to the second control region size during a cross-carrier communication. Within such embodiment communication component 940 may be configured to receive a Physical Downlink Control Channel via the first carrier, whereas a Physical Downlink Shared Channel is received via the second carrier.

In a second exemplary embodiment, wireless terminal 900 is configured to determine control region sizes by decoding a set of reverse interleaved modulation symbols. Within such embodiment, communication component 940 is configured to receive a set of reverse interleaved modulation symbols which are mapped beginning from a last data symbol and ending with a first available data symbol, whereas decoding component 950 is configured to decode the first control region size and the second control region size by de-interleaving the set of reverse interleaved modulation symbols. In an aspect, the set of reverse interleaved modulation symbols is mapped according to a frequency first, time second, interleaving scheme whereas, in another aspect, the set of modulation symbols is associated with a Physical Downlink Shared Channel. In yet another aspect, decoding component 950 is configured to erase an initial sequence of the set of reverse interleaved modulation symbols, wherein the initial sequence begins with the last data symbol.

Figure 10:
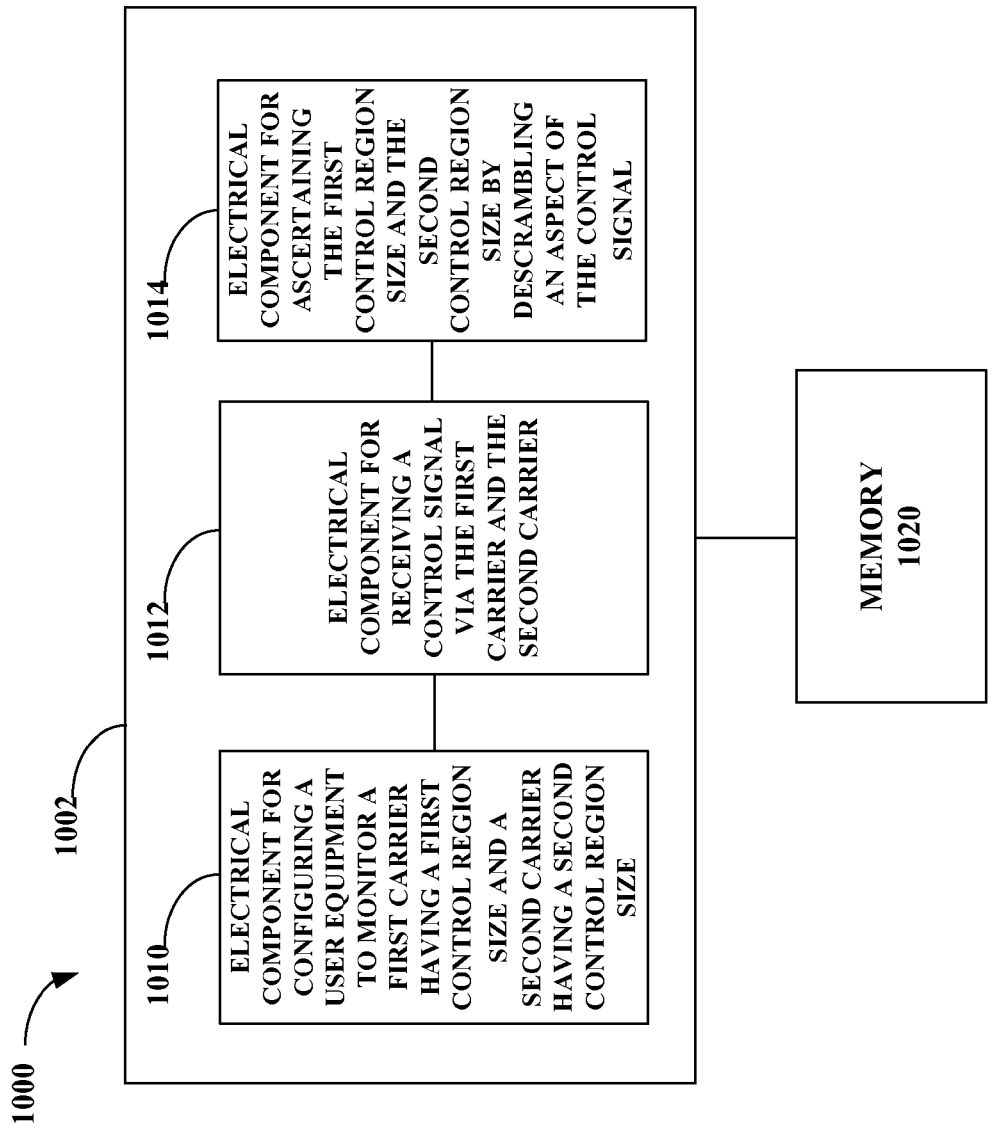
FIG. 10 is an illustration of a first exemplary coupling of electrical components that effectuate determining a control region size.

Turning to FIG. 10, illustrated is a system 1000 that facilitates determining a size of a control region according to an embodiment. System 1000 and/or instructions for implementing system 1000 can reside within a user equipment (e.g., wireless terminal 900) or a computer-readable storage medium, for instance. As depicted, system 1000 includes functional blocks that can represent functions implemented by a processor, software, or combination thereof (e.g., firmware). System 1000 includes a logical grouping 1002 of electrical components that can act in conjunction. As illustrated, logical grouping 1002 can include an electrical component for configuring a user equipment to monitor a first carrier having a first control region size and a second carrier having a second control region size 1010. Furthermore, logical grouping 1002 can include an electrical component for receiving a control signal via the first carrier and the second carrier 1012. Logical grouping 1002 can also include an electrical component for ascertaining the first control region size and the second control region size by descrambling an aspect of the control signal 1014. Additionally, system 1000 can include a memory 1020 that retains instructions for executing functions associated with electrical components 1010, 1012, and 1014. While shown as being external to memory 1020, it is to be understood that electrical components 1010, 1012, and 1014 can exist within memory 1020.

Figure 11:
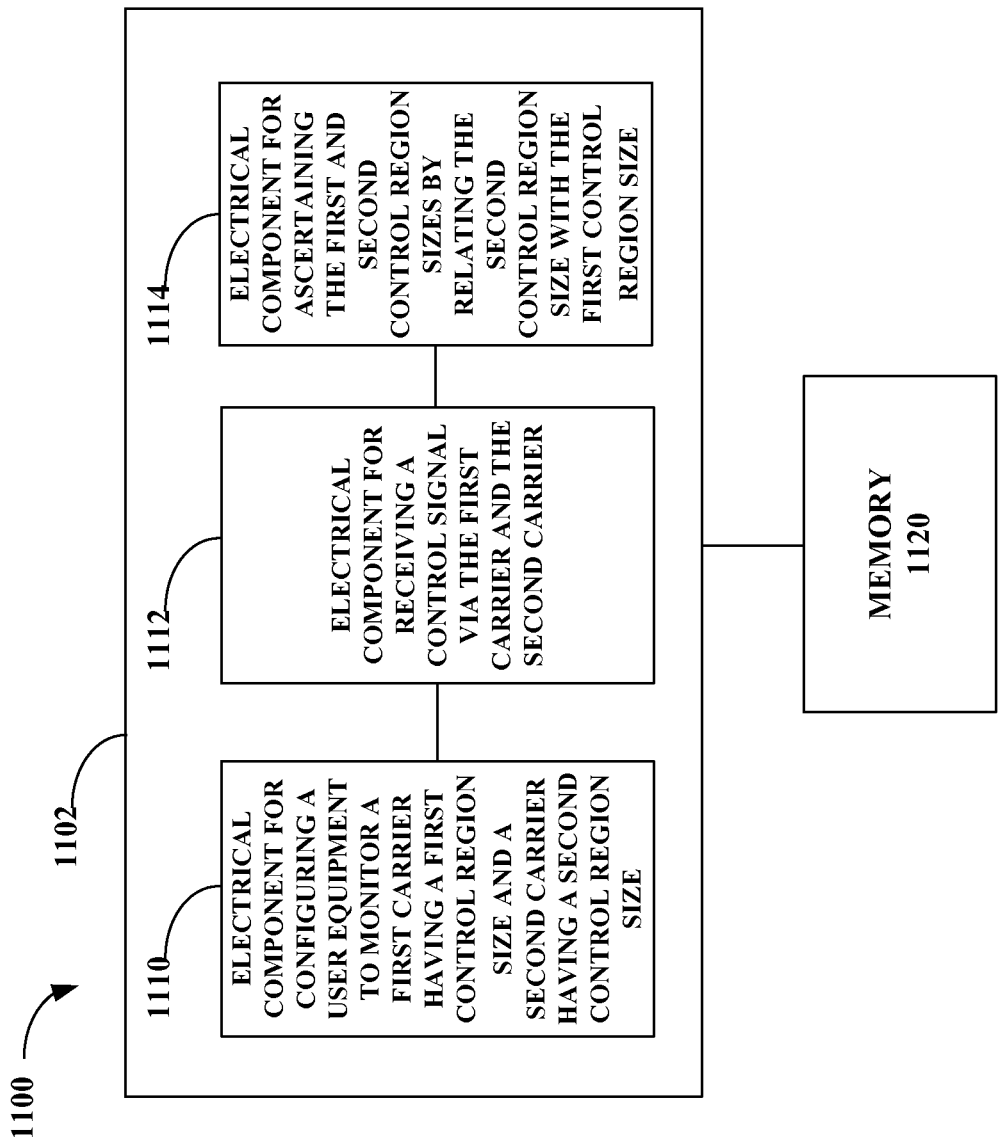
FIG. 11 is an illustration of a second exemplary coupling of electrical components that effectuate determining a control region size.

Referring next to FIG. 11, illustrated is another system 1100 that facilitates determining a size of a control region according to an embodiment. System 1100 and/or instructions for implementing system 1100 can also reside within a user equipment (e.g., wireless terminal 900) or a computer-readable storage medium, for instance, wherein system 1100 includes functional blocks that can represent functions implemented by a processor, software, or combination thereof (e.g., firmware). Moreover, system 1100 includes a logical grouping 1102 of electrical components that can act in conjunction similar to logical grouping 1002 in system 1000. As illustrated, logical grouping 1102 can include an electrical component for configuring a user equipment to monitor a first carrier having a first control region size and a second carrier having a second control region size 1110. Furthermore, logical grouping 1102 can include an electrical component for receiving a control signal via the first carrier and the second carrier 1112. Logical grouping 1102 can also include an electrical component for ascertaining the first and second control region sizes by relating the second control region size with the first control region size 1114. Additionally, system 1100 can include a memory 1120 that retains instructions for executing functions associated with electrical components 1110, 1112, and 1114. While shown as being external to memory 1120, it is to be understood that electrical components 1110, 1112, and 1114 can exist within memory 1120.

Figure 12:
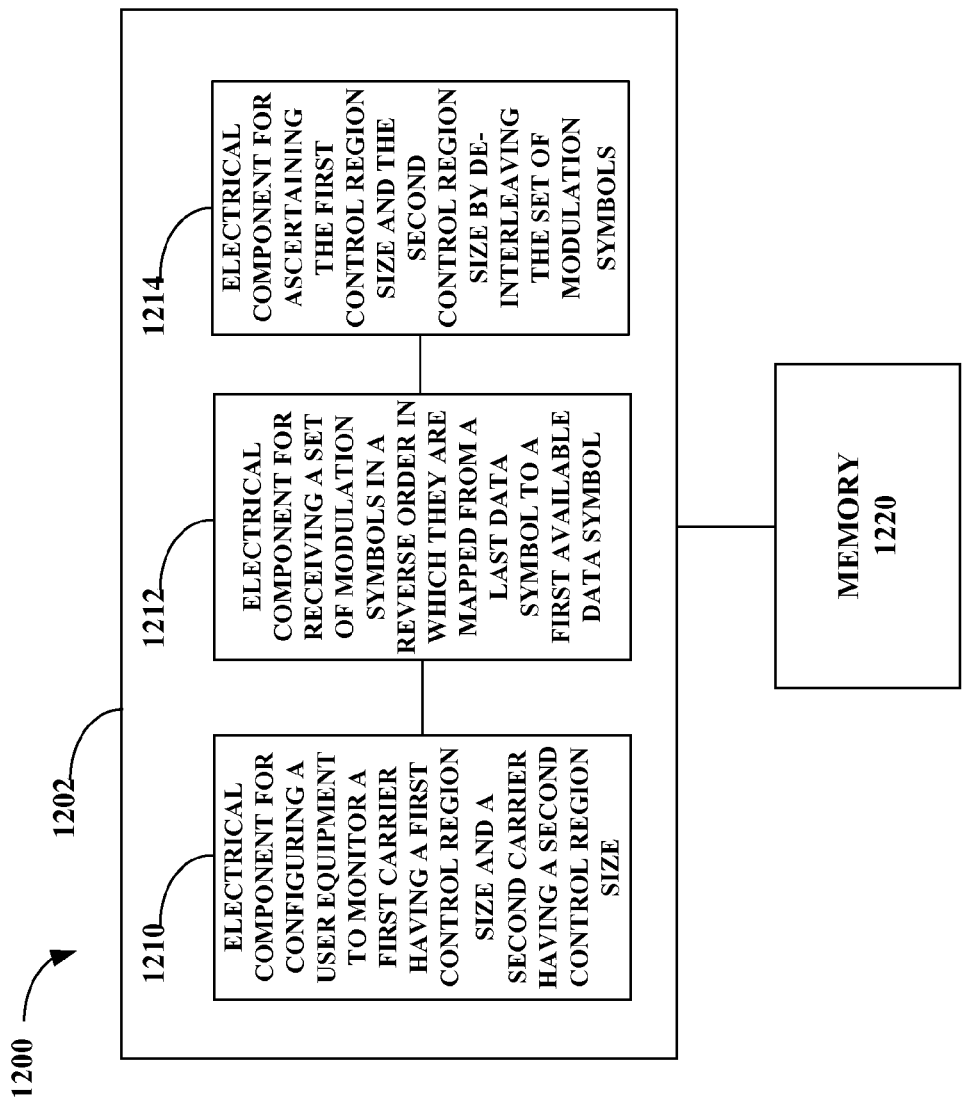
FIG. 12 is an illustration of a third exemplary coupling of electrical components that effectuate determining a control region size.

Referring next to FIG. 12, yet another exemplary system 1200 that facilitates determining a size of a control region is illustrated. System 1200 and/or instructions for implementing system 1200 can physically reside within a user equipment (e.g., wireless terminal 900) or computer-readable storage medium, for instance, wherein system 1200 includes functional blocks that can represent functions implemented by a processor, software, or combination thereof (e.g., firmware). Moreover, system 1200 includes a logical grouping 1202 of electrical components that can act in conjunction similar to logical groupings 1002 and 1102 in systems 1000 and 1100, respectively. As illustrated, logical grouping 1202 can include an electrical component for configuring a user equipment to monitor a first carrier having a first control region size and a second carrier having a second control region size 1210. Furthermore, logical grouping 1202 can include an electrical component for receiving a set of modulation symbols in a reverse order in which they are mapped from a last data symbol to a first available data symbol 1212. Logical grouping 1202 can also include an electrical component for ascertaining the first control region size and the second control region size by de-interleaving the set of modulation symbols 1214. Additionally, system 1200 can include a memory 1220 that retains instructions for executing functions associated with electrical components 1210, 1212, and 1214. While shown as being external to memory 1220, it is to be understood that electrical components 1210, 1212, and 1214 can exist within memory 1220.

Figure 13:
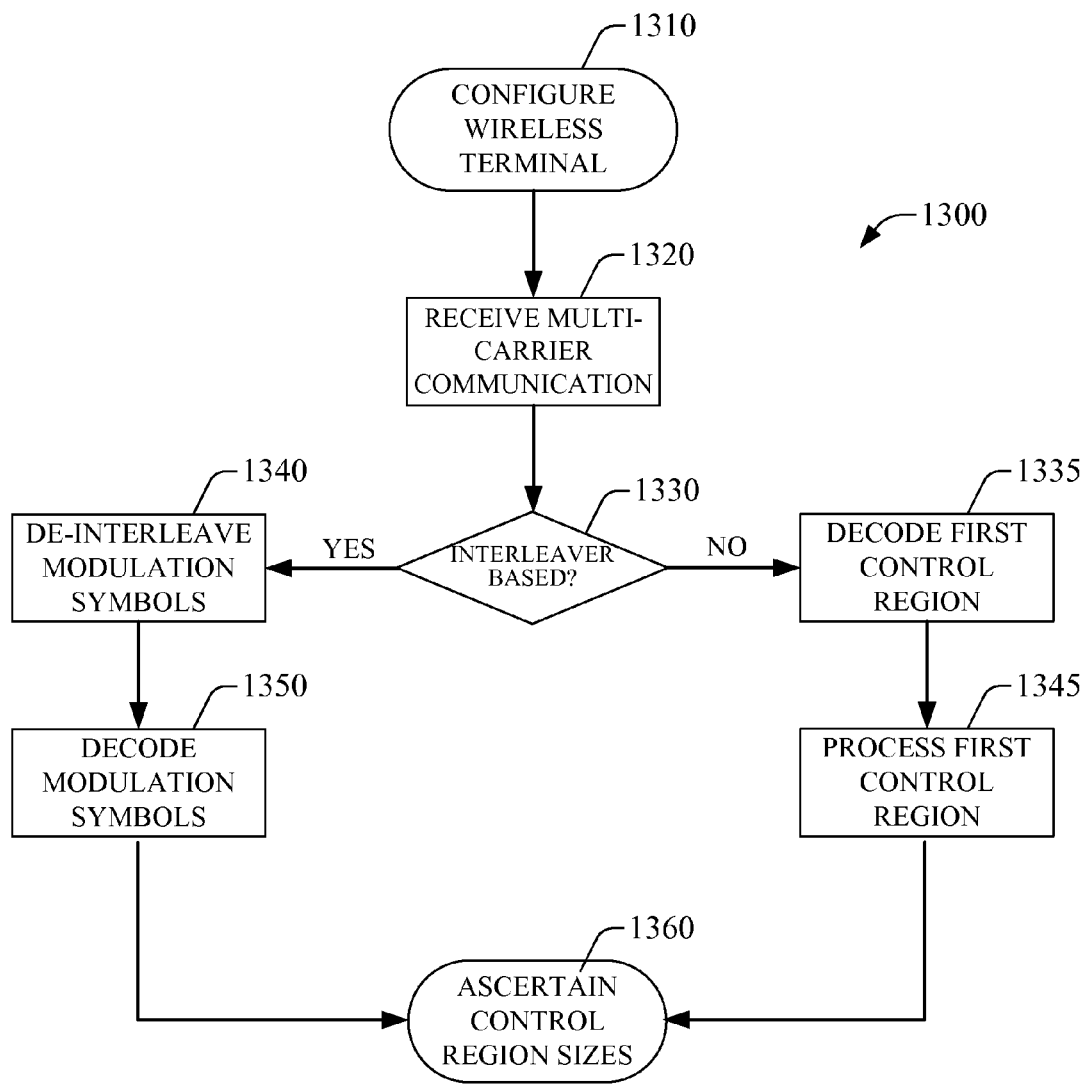
FIG. 13 is flow chart illustrating an exemplary methodology for facilitating determining a control region size in accordance with an aspect of the subject specification.

Referring next to FIG. 13, a flow chart illustrating an exemplary method for facilitating determining a size of a control region is provided. As illustrated, process 1300 includes a series of acts that may be performed by various components of a user equipment (e.g., wireless terminal 900) according to an aspect of the subject specification. Process 1300 may be implemented by employing at least one processor to execute computer executable instructions stored on a computer readable storage medium to implement the series of acts. In another embodiment, a computer-readable storage medium comprising code for causing at least one computer to implement the acts of process 1300 are contemplated.

In an aspect, process 1300 begins with a wireless terminal being configured at act 1310. Here, it should be noted that the wireless terminal may be pre-configured and/or dynamically configured according to instructions received from a network entity. Also, since multi-carrier operations are contemplated, a multi-carrier communication is subsequently received from a network entity at act 1320.

As stated previously, a network entity may implement any of a plurality of algorithms for indicating control region sizes. In an aspect, the configuration of the wireless terminal at act 1310 is in accordance with the particular algorithm implemented by the network entity, which may include interleaver-based algorithms, as well as algorithms in which control region sizes are encoded within a control signal. Accordingly, at act 1330, process 1300 may include a determination of whether an interleaver-based algorithm was implemented.

If an interleaver-based algorithm was indeed implemented, process 1300 proceeds to act 1340 where a set of reverse interleaved modulation symbols received from the network entity are de-interleaved. Once the modulation symbols are de-interleaved, the modulation symbols are then decoded at act 1350. Next, at act 1360, process 1300 concludes with the control region sizes being ascertained in accordance with the interleaver-based algorithm.

In an aspect, if an interleaver-based algorithm was not implemented, the control region sizes may be decoded from the control signal. Within such embodiment, process 1300 may proceed to act 1335 where a first control region, associated with a first carrier, is decoded. Once the first control region is decoded, aspects of the first control region are subsequently processed at act 1345, wherein the control region sizes are subsequently ascertained at act 1360 by either descrambling an aspect of the control signal, and/or relating the first control region size with a second control region size associated with a second carrier.

Figure 14:
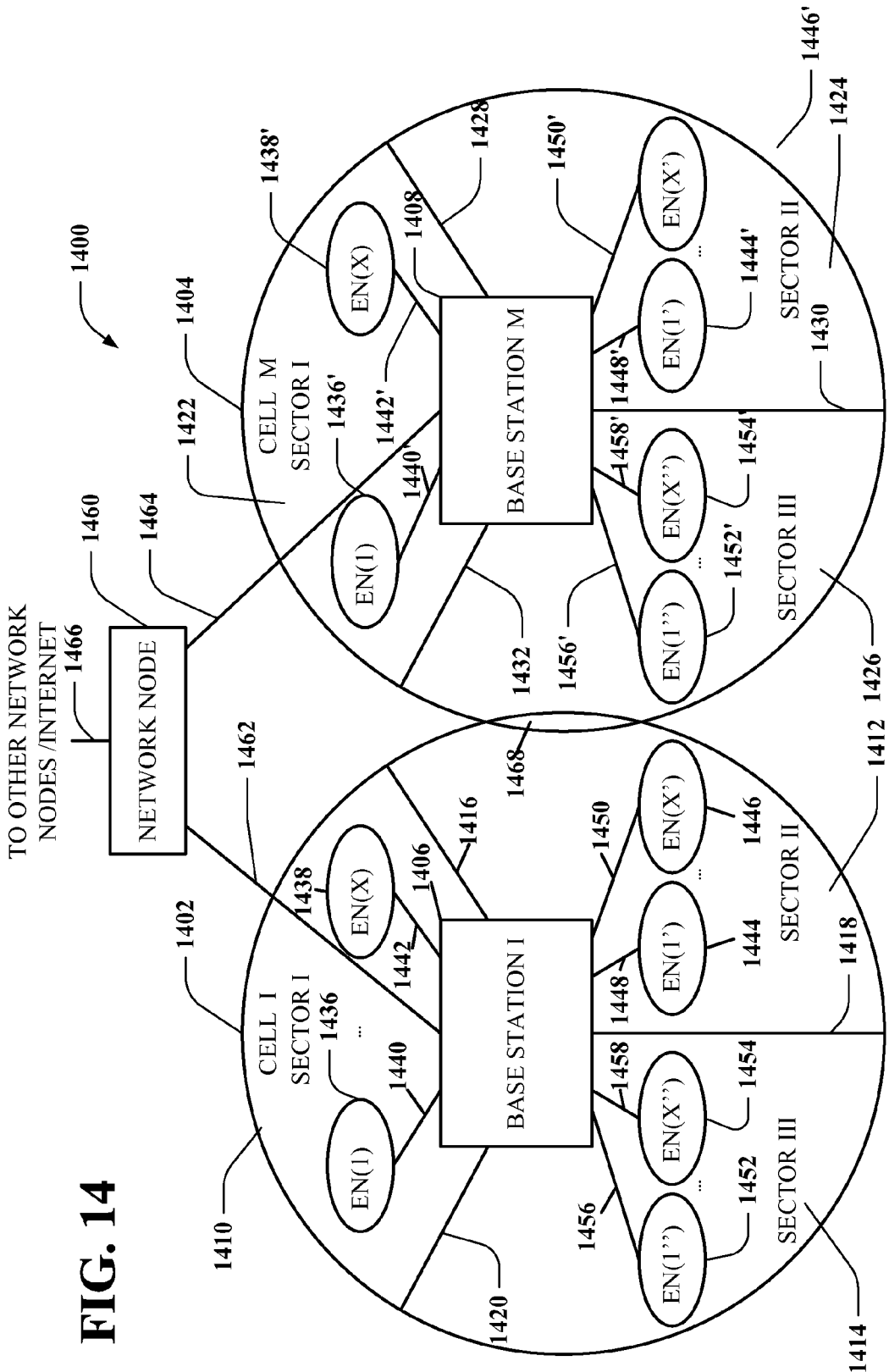
FIG. 14 is an illustration of an exemplary communication system implemented in accordance with various aspects including multiple cells.

Referring next to FIG. 14, an exemplary communication system 1400 implemented in accordance with various aspects is provided including multiple cells: cell I 1402, cell M 1404. Here, it should be noted that neighboring cells 1402, 1404 overlap slightly, as indicated by cell boundary region 1468, thereby creating potential for signal interference between signals transmitted by base stations in neighboring cells. Each cell 1402, 1404 of system 1400 includes three sectors. Cells which have not been subdivided into multiple sectors (N=1), cells with two sectors (N=2) and cells with more than 3 sectors (N>3) are also possible in accordance with various aspects. Cell 1402 includes a first sector, sector I 1410, a second sector, sector II 1412, and a third sector, sector III 1414. Each sector 1410, 1412, and 1414 has two sector boundary regions; each boundary region is shared between two adjacent sectors.

Sector boundary regions provide potential for signal interference between signals transmitted by base stations in neighboring sectors. Line 1416 represents a sector boundary region between sector I 1410 and sector II 1412; line 1418 represents a sector boundary region between sector II 1412 and sector III 1414; line 1420 represents a sector boundary region between sector III 1414 and sector 1 1410. Similarly, cell M 1404 includes a first sector, sector I 1422, a second sector, sector II 1424, and a third sector, sector III 1426. Line 1428 represents a sector boundary region between sector I 1422 and sector II 1424; line 1430 represents a sector boundary region between sector II 1424 and sector III 1426; line 1432 represents a boundary region between sector III 1426 and sector I 1422. Cell I 1402 includes a base station (BS), base station I 1406, and a plurality of end nodes (ENs) in each sector 1410, 1412, 1414. Sector I 1410 includes EN(1) 1436 and EN(X) 1438 coupled to BS 1406 via wireless links 1440, 1442, respectively; sector II 1412 includes EN(1') 1444 and EN(X') 1446 coupled to BS 1406 via wireless links 1448, 1450, respectively; sector III 1414 includes EN(1") 1452 and EN(X") 1454 coupled to BS 1406 via wireless links 1456, 1458, respectively. Similarly, cell M 1404 includes base station M 1408, and a plurality of end nodes (ENs) in each sector 1422, 1424, and 1426. Sector I 1422 includes EN(1) 1436' and EN(X) 1438' coupled to BS M 1408 via wireless links 1440', 1442', respectively; sector II 1424 includes EN(1') 1444' and EN(X') 1446' coupled to BS M 1408 via wireless links 1448', 1450', respectively; sector 3 1426 includes EN(1") 1452' and EN(X") 1454' coupled to BS 1408 via wireless links 1456', 1458', respectively.

System 1400 also includes a network node 1460 which is coupled to BS I 1406 and BS M 1408 via network links 1462, 1464, respectively. Network node 1460 is also coupled to other network nodes, e.g., other base stations, AAA server nodes, intermediate nodes, routers, etc. and the Internet via network link 1466. Network links 1462, 1464, 1466 may be, e.g., fiber optic cables. Each end node, e.g. EN 1 1436 may be a wireless terminal including a transmitter as well as a receiver. The wireless terminals, e.g., EN(1) 1436 may move through system 1400 and may communicate via wireless links with the base station in the cell in which the EN is currently located. The wireless terminals, (WTs), e.g. EN(1) 1436, may communicate with peer nodes, e.g., other WTs in system 1400 or outside system 1400 via a base station, e.g. BS 1406, and/or network node 1460. WTs, e.g., EN(1) 1436 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Figure 15:
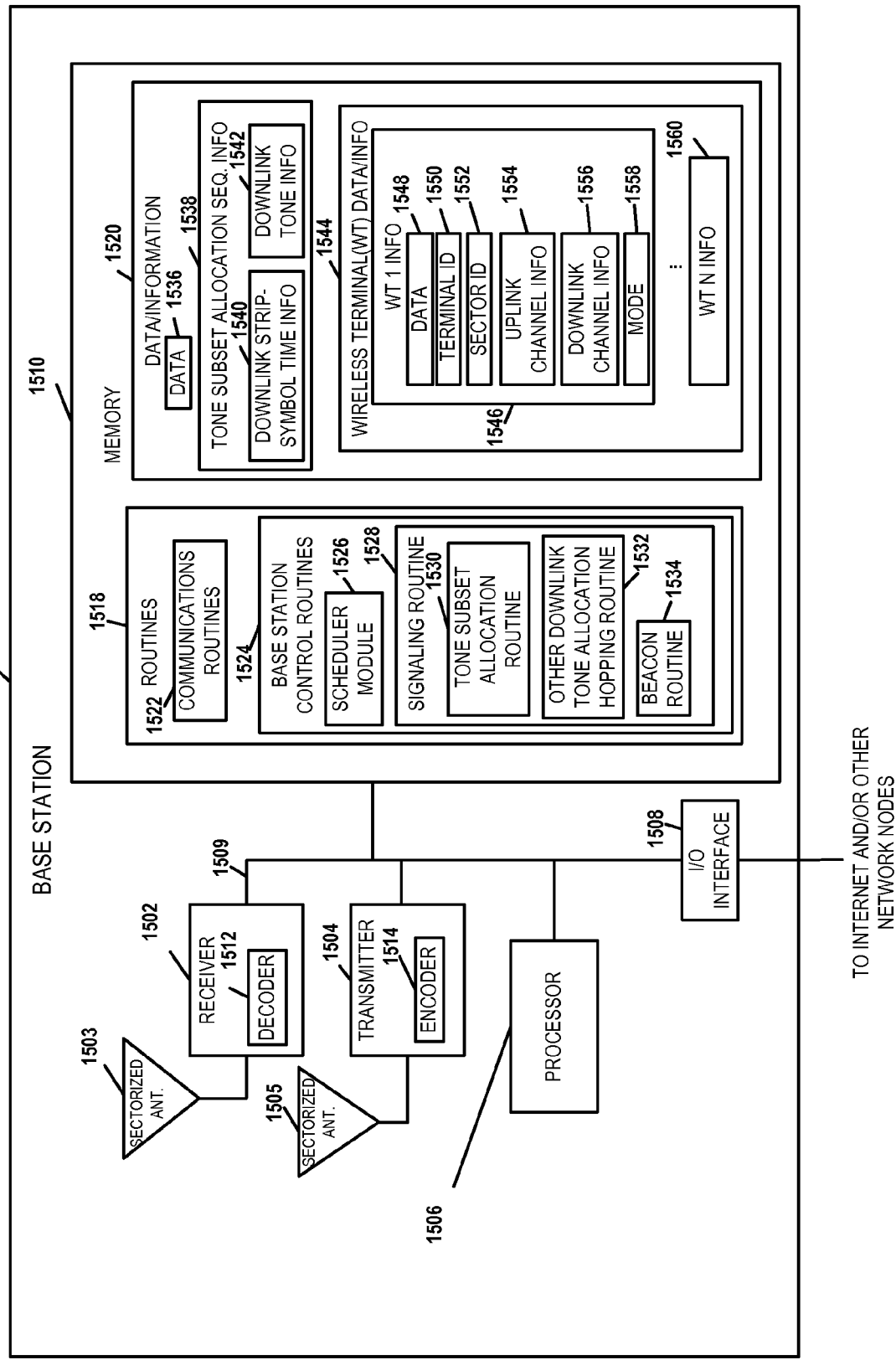
FIG. 15 is an illustration of an exemplary base station in accordance with various aspects described herein.

FIG. 15 illustrates an example base station 1500 in accordance with various aspects. Base station 1500 implements tone subset allocation sequences, with different tone subset allocation sequences generated for respective different sector types of the cell. Base station 1500 may be used as any one of base stations 1406, 1408 of the system 1400 of FIG. 14. The base station 1500 includes a receiver 1502, a transmitter 1504, a processor 1506, e.g., CPU, an input/output interface 1508 and memory 1510 coupled together by a bus 1509 over which various elements 1502, 1504, 1506, 1508, and 1510 may interchange data and information.

Sectorized antenna 1503 coupled to receiver 1502 is used for receiving data and other signals, e.g., channel reports, from wireless terminals transmissions from each sector within the base station's cell. Sectorized antenna 1505 coupled to transmitter 1504 is used for transmitting data and other signals, e.g., control signals, pilot signal, beacon signals, etc. to wireless terminals 1600 (see FIG. 16) within each sector of the base station's cell. In various aspects, base station 1500 may employ multiple receivers 1502 and multiple transmitters 1504, e.g., an individual receivers 1502 for each sector and an individual transmitter 1504 for each sector. Processor 1506, may be, e.g., a general purpose central processing unit (CPU). Processor 1506 controls operation of base station 1500 under direction of one or more routines 1518 stored in memory 1510 and implements the methods. I/O interface 1508 provides a connection to other network nodes, coupling the BS 1500 to other base stations, access routers, AAA server nodes, etc., other networks, and the Internet. Memory 1510 includes routines 1518 and data/information 1520.

Data/information 1520 includes data 1536, tone subset allocation sequence information 1538 including downlink strip-symbol time information 1540 and downlink tone information 1542, and wireless terminal (WT) data/info 1544 including a plurality of sets of WT information: WT 1 info 1546 and WT N info 1560. Each set of WT info, e.g., WT 1 info 1546 includes data 1548, terminal ID 1550, sector ID 1552, uplink channel information 1554, downlink channel information 1556, and mode information 1558.

Routines 1518 include communications routines 1522 and base station control routines 1524. Base station control routines 1524 includes a scheduler module 1526 and signaling routines 1528 including a tone subset allocation routine 1530 for strip-symbol periods, other downlink tone allocation hopping routine 1532 for the rest of symbol periods, e.g., non strip-symbol periods, and a beacon routine 1534.

Data 1536 includes data to be transmitted that will be sent to encoder 1514 of transmitter 1504 for encoding prior to transmission to WTs, and received data from WTs that has been processed through decoder 1512 of receiver 1502 following reception. Downlink strip-symbol time information 1540 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1542 includes information including a carrier frequency assigned to the base station 1500, the number and frequency of tones, and the set of tone subsets to be allocated to the strip-symbol periods, and other cell and sector specific values such as slope, slope index and sector type.

Data 1548 may include data that WT1 1600 has received from a peer node, data that WT 1 1600 desires to be transmitted to a peer node, and downlink channel quality report feedback information. Terminal ID 1550 is a base station 1500 assigned ID that identifies WT 1 1600. Sector ID 1552 includes information identifying the sector in which WT1 1600 is operating. Sector ID 1552 can be used, for example, to determine the sector type. Uplink channel information 1554 includes information identifying channel segments that have been allocated by scheduler 1526 for WT1 1600 to use, e.g., uplink traffic channel segments for data, dedicated uplink control channels for requests, power control, timing control, etc. Each uplink channel assigned to WT1 1600 includes one or more logical tones, each logical tone following an uplink hopping sequence. Downlink channel information 1556 includes information identifying channel segments that have been allocated by scheduler 1526 to carry data and/or information to WT1 1600, e.g., downlink traffic channel segments for user data. Each downlink channel assigned to WT1 1600 includes one or more logical tones, each following a downlink hopping sequence. Mode information 1558 includes information identifying the state of operation of WT1 1600, e.g. sleep, hold, on.

Communications routines 1522 control the base station 1500 to perform various communications operations and implement various communications protocols. Base station control routines 1524 are used to control the base station 1500 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1528 controls the operation of receiver 1502 with its decoder 1512 and transmitter 1504 with its encoder 1514. The signaling routine 1528 is responsible controlling the generation of transmitted data 1536 and control information. Tone subset allocation routine 1530 constructs the tone subset to be used in a strip-symbol period using the method of the aspect and using data/info 1520 including downlink strip-symbol time info 1540 and sector ID 1552. The downlink tone subset allocation sequences will be different for each sector type in a cell and different for adjacent cells. The WTs 1600 receive the signals in the strip-symbol periods in accordance with the downlink tone subset allocation sequences; the base station 1500 uses the same downlink tone subset allocation sequences in order to generate the transmitted signals. Other downlink tone allocation hopping routine 1532 constructs downlink tone hopping sequences, using information including downlink tone information 1542, and downlink channel information 1556, for the symbol periods other than the strip-symbol periods. The downlink data tone hopping sequences are synchronized across the sectors of a cell. Beacon routine 1534 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 16:
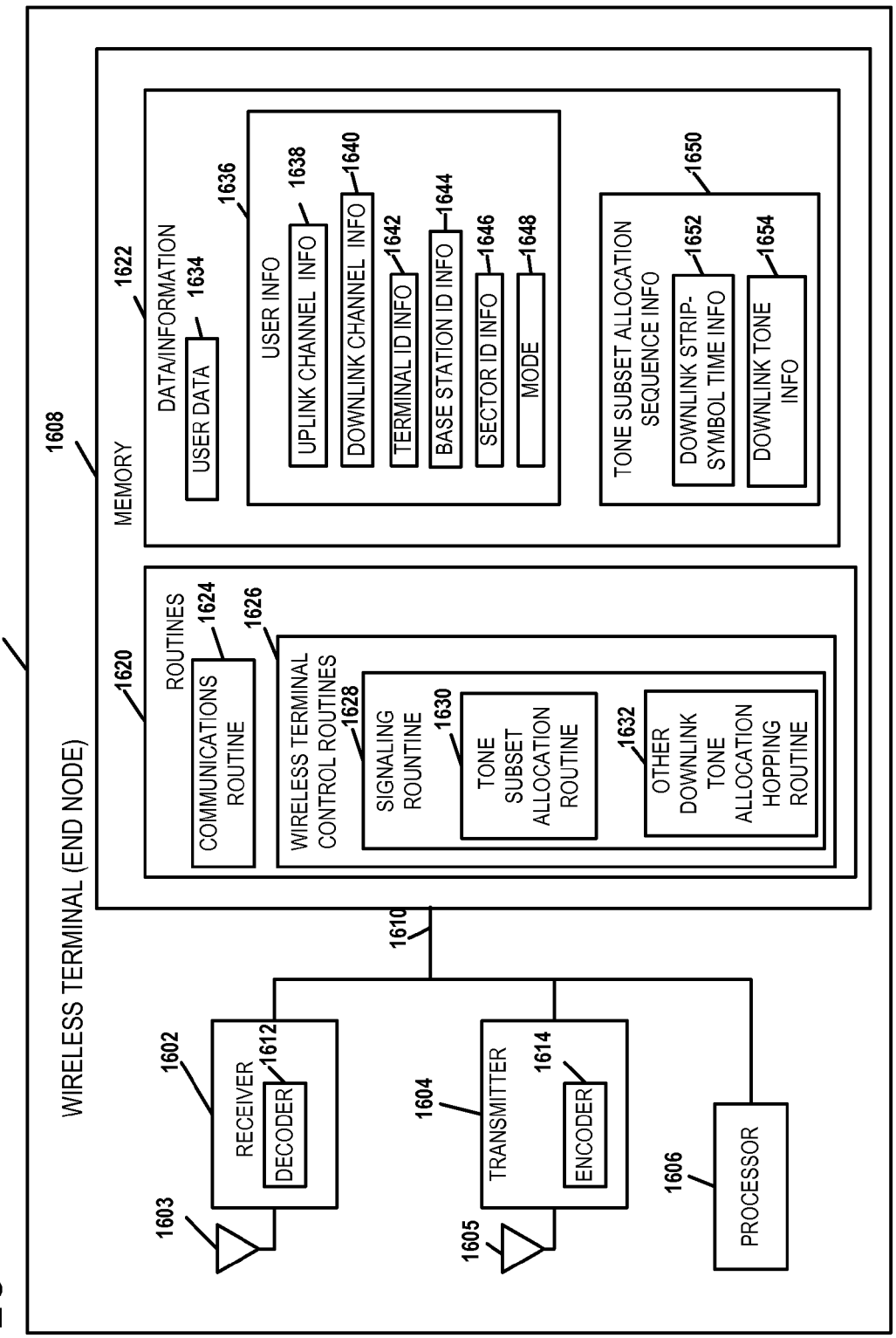
FIG. 16 is an illustration of an exemplary wireless terminal implemented in accordance with various aspects described herein.

FIG. 16 illustrates an example wireless terminal (end node) 1600 which can be used as any one of the wireless terminals (end nodes), e.g., EN(1) 1436, of the system 1400 shown in FIG. 14. Wireless terminal 1600 implements the tone subset allocation sequences. The wireless terminal 1600 includes a receiver 1602 including a decoder 1612, a transmitter 1604 including an encoder 1614, a processor 1606, and memory 1608 which are coupled together by a bus 1610 over which the various elements 1602, 1604, 1606, 1608 can interchange data and information. An antenna 1603 used for receiving signals from a base station (and/or a disparate wireless terminal) is coupled to receiver 1602. An antenna 1605 used for transmitting signals, e.g., to a base station (and/or a disparate wireless terminal) is coupled to transmitter 1604.

The processor 1606, e.g., a CPU controls the operation of the wireless terminal 1600 and implements methods by executing routines 1620 and using data/information 1622 in memory 1608.

Data/information 1622 includes user data 1634, user information 1636, and tone subset allocation sequence information 1650. User data 1634 may include data, intended for a peer node, which will be routed to encoder 1614 for encoding prior to transmission by transmitter 1604 to a base station, and data received from the base station which has been processed by the decoder 1612 in receiver 1602. User information 1636 includes uplink channel information 1638, downlink channel information 1640, terminal ID information 1642, base station ID information 1644, sector ID information 1646, and mode information 1648. Uplink channel information 1638 includes information identifying uplink channels segments that have been assigned by a base station for wireless terminal 1600 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1640 includes information identifying downlink channel segments that have been assigned by a base station to WT 1600 for use when the base station is transmitting data/information to WT 1600. Downlink channels may include downlink traffic channels and assignment channels, each downlink channel including one or more logical tone, each logical tone following a downlink hopping sequence, which is synchronized between each sector of the cell.

User info 1636 also includes terminal ID information 1642, which is a base station-assigned identification, base station ID information 1644 which identifies the specific base station that WT has established communications with, and sector ID info 1646 which identifies the specific sector of the cell where WT 1600 is presently located. Base station ID 1644 provides a cell slope value and sector ID info 1646 provides a sector index type; the cell slope value and sector index type may be used to derive tone hopping sequences. Mode information 1648 also included in user info 1636 identifies whether the WT 1600 is in sleep mode, hold mode, or on mode.

Tone subset allocation sequence information 1650 includes downlink strip-symbol time information 1652 and downlink tone information 1654. Downlink strip-symbol time information 1652 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1654 includes information including a carrier frequency assigned to the base station, the number and frequency of tones, and the set of tone subsets to be allocated to the strip-symbol periods, and other cell and sector specific values such as slope, slope index and sector type.

Routines 1620 include communications routines 1624 and wireless terminal control routines 1626. Communications routines 1624 control the various communications protocols used by WT 1600. Wireless terminal control routines 1626 controls basic wireless terminal 1600 functionality including the control of the receiver 1602 and transmitter 1604. Wireless terminal control routines 1626 include the signaling routine 1628. The signaling routine 1628 includes a tone subset allocation routine 1630 for the strip-symbol periods and an other downlink tone allocation hopping routine 1632 for the rest of symbol periods, e.g., non strip-symbol periods. Tone subset allocation routine 1630 uses user data/info 1622 including downlink channel information 1640, base station ID info 1644, e.g., slope index and sector type, and downlink tone information 1654 in order to generate the downlink tone subset allocation sequences in accordance with some aspects and process received data transmitted from the base station. Other downlink tone allocation hopping routine 1630 constructs downlink tone hopping sequences, using information including downlink tone information 1654, and downlink channel information 1640, for the symbol periods other than the strip-symbol periods. Tone subset allocation routine 1630, when executed by processor 1606, is used to determine when and on which tones the wireless terminal 1600 is to receive one or more strip-symbol signals from the base station 1500. The uplink tone allocation hopping routine 1630 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates indicating a size of a control region, the method comprising:
    establishing a multi-carrier communication, the multi-carrier communication facilitated by a first carrier and a second carrier;
    ascertaining a first control region size and a second control region size, the first control region size associated with the first carrier, the second control region size associated with the second carrier;
    generating a control signal, the generating including encoding the second control region size onto the control signal by scrambling an aspect of the control signal based on the second control region size, wherein the second control region size is conveyed according to a pre-determined pattern; and
    transmitting the control signal over the first carrier to support the multi-carrier communication on the second carrier for at least one user equipment.

2. The method of claim 1, wherein the aspect of the control signal is a cyclic redundancy check.

3. The method of claim 1, the transmitting comprising allocating an unused resource element group to encode the second control region size onto the first carrier, wherein the unused resource element group is included in a sequence of resource element groups and resides after a used resource element group.

4. The method of claim 3, wherein the used resource element group is allocated to the first carrier, and wherein the used resource element group is associated with at least one of a Physical Control Format Indicator Channel, a Physical Hybrid Automatic Repeat Request Indicator Channel, or a Physical Downlink Control Channel.

5. The method of claim 1, the transmitting comprising allocating a resource for the encoding of the second control region size onto the first carrier, the resource being at least one of a last set of control channel elements in a sequence of control channel elements, the last set of control channel elements associated with a Physical Downlink Control Channel.

6. The method of claim 1, the transmitting comprising allocating a resource for the encoding of the second control region size onto the first carrier, the resource associated with a Physical Hybrid Automatic Repeat Request Indicator Channel.

7. The method of claim 1, the transmitting comprising conveying the second control region size in a data region of the first carrier, the conveying occurs according to the pre-determined pattern and during a cross-carrier communication, wherein a Physical Downlink Control Channel transmission is transmitted over the first carrier, and wherein a Physical Downlink Shared Channel transmission is transmitted over the second carrier.

8. The method of claim 7, further comprising puncturing the Physical Downlink Shared Channel transmission using the data region of the first carrier.

9. The method of claim 7, further comprising rate matching the Physical Downlink Shared Channel transmission using the data region of the first carrier.

10. The method of claim 1, further comprising configuring the at least one user equipment to assume that the first control region size is equal to the second control region size during a cross-carrier communication, wherein a Physical Downlink Control Channel transmission is transmitted over the first carrier, and wherein a Physical Downlink Shared Channel transmission is transmitted over the second carrier.

11. An apparatus configured to facilitate indicating a size of a control region, the apparatus comprising:
a processor configured to execute computer executable components stored in memory, the components including:
a communication component configured to communicate a control signal via a multi-carrier communication, the control signal transmitted over a first carrier to support the multi-carrier communication on a second carrier for at least one user equipment;
a control format component configured to ascertain a first control region size and a second control region size, the first control region size associated with the first carrier, the second control region size associated with the second carrier; and
a generation component configured to generate the control signal, the generating including encoding the second control region size onto the control signal by scrambling an aspect of the control signal based on the second control region size, wherein the second control region size is conveyed according to a pre-determined pattern.

12. The apparatus of claim 11, the generation component further configured to provide a generalized Physical Control Format Indicator Channel value on the second carrier.

13. The apparatus of claim 12, wherein a cross-carrier number of Physical Control Format Indicator Channel values is different than a same-carrier number of Physical Control Format Indicator Channel values.

14. The apparatus of claim 11, further comprising an allocation component configured to allocate a resource for encoding the second control region size onto the first carrier.

15. The apparatus of claim 14, the resource being an unused resource element group in a sequence of resource element groups, the unused resource element group residing after a used resource element group.

16. The apparatus of claim 15, the allocation component configured to allocate the used resource element group to the first carrier, wherein the used resource element group is associated with at least one of a Physical Control Format Indicator Channel, a Physical Hybrid Automatic Repeat Request Indicator Channel, or a Physical Downlink Control Channel.

17. The apparatus of claim 14, the resource being at least one of a last set of control channel elements in a sequence of control channel elements, the last set of control channel elements associated with a Physical Downlink Control Channel.

18. The apparatus of claim 14, the resource associated with a Physical Hybrid Automatic Repeat Request Indicator Channel.

19. The apparatus of claim 11, the generation component configured to convey the second control region size in a data region of the first carrier according to the pre-determined pattern and during a cross-carrier communication, wherein the communication component is configured to transmit a Physical Downlink Control Channel transmission over the first carrier, and wherein the communication component is configured to transmit a Physical Downlink Shared Channel transmission over the second carrier.

20. The apparatus of claim 19, the generation component configured to puncture the Physical Downlink Shared Channel transmission using the data region of the first carrier, or rate match the Physical Downlink Shared Channel transmission using the data region of the first carrier.

21. The apparatus of claim 11, the generation component further configured to configure the at least one user equipment to assume that the first control region size is equal to the second control region size during a cross-carrier communication, wherein the communication component is configured to transmit a Physical Downlink Control Channel transmission over the first carrier, and wherein the communication component is configured to transmit a Physical Downlink Shared Channel transmission over the second carrier.

22. A computer program product that facilitates indicating a size of a control region, comprising:
a non-transitory computer-readable storage medium comprising code for causing at least one computer to:
establish a multi-carrier communication, the multi-carrier communication facilitated by a first carrier and a second carrier;
determine a first control region size and a second control region size, the first control region size related to the first carrier, the second control region size related to the second carrier;
provide a control signal, the providing including encoding the second control region size onto the control signal by scrambling an aspect of the control signal based on the second control region size, wherein the second control region size is conveyed according to a pre-determined pattern; and
communicate the control signal over the first carrier to support the multi-carrier communication on the second carrier for at least one user equipment.

23. The computer program product of claim 22, the code further causing the at least one computer to allocate a resource for encoding the second control region size onto the first carrier.

24. The computer program product of claim 23, the resource being an unused resource element group in a sequence of resource element groups, the unused resource element group residing after a used resource element group.

25. The computer program product of claim 24, the code further causing the at least one computer to allocate the used resource element group to the first carrier, wherein the used resource element group is associated with at least one of a Physical Control Format Indicator Channel, a Physical Hybrid Automatic Repeat Request Indicator Channel, or a Physical Downlink Control Channel.

26. The computer program product of claim 23, the resource being at least one of a last set of control channel elements in a sequence of control channel elements, the last set of control channel elements associated with a Physical Downlink Control Channel.

27. The computer program product of claim 23, the resource associated with a Physical Hybrid Automatic Repeat Request Indicator Channel.

28. An apparatus configured to facilitate indicating a size of a control region, the apparatus comprising:
means for transmitting a control signal via a multi-carrier communication, the control signal transmitted over a first carrier to support the multi-carrier communication on a second carrier for at least one user equipment;
means for determining a first control region size and a second control region size, the first control region size associated with the first carrier, the second control region size associated with the second carrier; and
means for generating the control signal, the generating including encoding the second control region size onto the control signal by scrambling an aspect of the control signal based on the second control region size, wherein the second control region size is conveyed according to a pre-determined pattern.

29. The apparatus of claim 28, wherein the aspect of the control signal is a cyclic redundancy check.

30. The apparatus of claim 28, the means for generating the control signal configured to configure the at least one user equipment to assume that the first control region size is equal to the second control region size during a cross-carrier communication, wherein the means for transmitting is configured to transmit a Physical Downlink Control Channel transmission over the first carrier, and wherein the means for transmitting is configured to transmit a Physical Downlink Shared Channel transmission over the second carrier.

31. A method that facilitates determining a size of a control region, the method comprising:
configuring a user equipment (UE) to monitor a first carrier and a second carrier;
receiving a control signal via the first carrier and the second carrier, the first carrier having a first control region size, the second carrier having a second control region size; and
ascertaining the first control region size and the second control region size, the ascertaining including descrambling an aspect of the control signal, wherein the second control region size is encoded onto the control signal by scrambling an aspect of the control signal based on the second control region size, and the second control region size is conveyed according to a pre-determined pattern.

32. The method of claim 31, wherein the aspect of the control signal is a cyclic redundancy check.

33. The method of claim 31, further comprising decoding the second control region size from the first carrier.

34. The method of claim 31, further comprising assuming that the first control region size is equal to the second control region size during a cross-carrier communication, wherein a Physical Downlink Control Channel is received via the first carrier, and wherein a Physical Downlink Shared Channel is received via the second carrier.

35. An apparatus configured to facilitate determining a size of a control region, the apparatus comprising:
a processor configured to execute computer executable components stored in memory, the components including:
a configuration component configured to direct a user equipment (UE) to monitor a first carrier and a second carrier;
a communication component configured to receive a control signal via the first carrier and the second carrier, the first carrier having a first control region size, the second carrier having a second control region size; and
a decoding component configured to determine the first control region size and the second control region size, the determining including descrambling an aspect of the control signal, wherein the second control region size is encoded onto the control signal by scrambling an aspect of the control signal based on the second control region size, and the second control region size is conveyed according to a pre-determined pattern.

36. The apparatus of claim 35, wherein the aspect of the control signal is a cyclic redundancy check.

37. The apparatus of claim 35, the decoding component configured to decode the second control region size from the first carrier.

38. The apparatus of claim 35, the decoding component configured to assume that the first control region size is equal to the second control region size during a cross-carrier communication, wherein a Physical Downlink Control Channel is received via the first carrier, and wherein a Physical Downlink Shared Channel is received via the second carrier.

39. A computer program product that facilitates determining a size of a control region, comprising:
a non-transitory computer-readable storage medium comprising code for causing at least one computer to:
configure a user equipment (UE) to monitor a first carrier and a second carrier;
receive a control signal via the first carrier and the second carrier, the first carrier having a first control region size, the second carrier having a second control region size; and
determine the first control region size and the second control region size, the determining including descrambling an aspect of the control signal, wherein the second control region size is encoded onto the control signal by scrambling an aspect of the control signal based on the second control region size, and the second control region size is conveyed according to a pre-determined pattern.

40. The computer program product of claim 39, the code further causing the at least one computer to assume that the first control region size is equal to the second control region size during a cross-carrier communication, wherein a Physical Downlink Control Channel is received via the first carrier, and wherein a Physical Downlink Shared Channel is received via the second carrier.

41. An apparatus configured to facilitate determining a size of a control region, the apparatus comprising:
means for initializing a user equipment (UE) to monitor a first carrier and a second carrier;
means for receiving a control signal via the first carrier and the second carrier, the first carrier having a first control region size, the second carrier having a second control region size; and
means for ascertaining the first control region size and the second control region size, the ascertaining descrambling an aspect of the control signal, wherein the second control region size is encoded onto the control signal by scrambling an aspect of the control signal based on the second control region size, and the second control region size is conveyed according to a pre-determined pattern.

42. The apparatus of claim 41, further comprising means for decoding the second control region size from the first carrier.

* * * * *